(12) United States Patent
Michael et al.

(10) Patent No.: US 11,451,315 B2
(45) Date of Patent: Sep. 20, 2022

(54) TRANSMISSION DEVICE, TRANSMISSION METHOD, RECEPTION DEVICE, AND RECEPTION METHOD

(71) Applicant: Saturn Licensing LLC, New York, NY (US)

(72) Inventors: Lachlan Bruce Michael, Saitama (JP); Kazuyuki Takahashi, Chiba (JP); Satoshi Okada, Tokyo (JP)

(73) Assignee: Saturn Licenssing LLC, New York, NY (US)

( * ) Notice: Subject to any disclaimer, the term of this patent is extended or adjusted under 35 U.S.C. 154(b) by 0 days.

(21) Appl. No.: 16/600,669

(22) Filed: Oct. 14, 2019

(65) Prior Publication Data

US 2020/0044761 A1 Feb. 6, 2020

Related U.S. Application Data

(63) Continuation of application No. 15/552,376, filed as application No. PCT/JP2016/055041 on Feb. 22, 2016, now Pat. No. 10,574,375.

(30) Foreign Application Priority Data

Mar. 4, 2015 (JP) ................................ 2015-042247

(51) Int. Cl.
*H04L 29/06* (2006.01)
*H04J 3/06* (2006.01)
(Continued)

(52) U.S. Cl.
CPC ........... *H04J 3/0667* (2013.01); *H04H 20/18* (2013.01); *H04L 65/4076* (2013.01);
(Continued)

(58) Field of Classification Search
CPC ...... H04J 3/0667; H04J 3/0664; H04H 20/18; H04H 60/40; H04L 65/608; H04L 65/607; H04L 65/4076; H04L 69/28; H04L 69/22
See application file for complete search history.

(56) References Cited

U.S. PATENT DOCUMENTS 7,606,575 B2 * 10/2009 Mahany ................ G07F 7/02
455/452.2
7,730,230 B1    6/2010 Kondapalli
(Continued)

FOREIGN PATENT DOCUMENTS

KR    10-2015-0005409 A    1/2015

OTHER PUBLICATIONS

Extended European Search Report dated Nov. 2, 2018 in European Application No. 16758783.1.
(Continued)

*Primary Examiner* — Parth Patel
(74) *Attorney, Agent, or Firm* — Oblon, McClelland, Maier & Neustadt, L.L.P.

(57) ABSTRACT

The present technology relates to a transmission device, a transmission method, a reception device, and a reception method that permit efficient transfer of time and other information.
The transmission device generates a physical layer frame having preambles and a payload that includes, in the preamble, time information representing time of a given position in a stream of physical layer frames and transmits the physical layer frame. The reception device receives the physical layer frame and performs processes using time information. The present technology is applicable, for example, to IP packet broadcasting.

20 Claims, 21 Drawing Sheets

(51) Int. Cl.
  *H04H 20/18* (2008.01)
  *H04L 65/611* (2022.01)
  *H04L 65/60* (2022.01)
  *H04L 65/65* (2022.01)
  *H04H 60/40* (2008.01)
  *H04L 69/22* (2022.01)
  *H04L 69/28* (2022.01)

(52) U.S. Cl.
  CPC .......... *H04L 65/607* (2013.01); *H04L 65/608* (2013.01); *H04H 60/40* (2013.01); *H04J 3/0664* (2013.01); *H04L 69/22* (2013.01); *H04L 69/28* (2013.01)

(56) References Cited

U.S. PATENT DOCUMENTS

| | | | |
|---|---|---|---|
| 7,801,181 B2 | 9/2010 | Song | |
| 7,817,650 B2 * | 10/2010 | Page | H04L 25/05 370/411 |
| 7,835,402 B2 | 11/2010 | Erich | |
| 8,155,695 B2 * | 4/2012 | Wang | H04W 72/1215 455/553.1 |
| 8,379,757 B1 * | 2/2013 | Zhang | H04L 27/2657 375/267 |
| 8,817,887 B2 * | 8/2014 | Ueki | H04N 21/23424 375/240.26 |
| 8,842,571 B1 * | 9/2014 | Yu | H04L 25/26 370/252 |
| 9,614,642 B2 * | 4/2017 | Hwang | H04L 1/0006 |
| 9,763,074 B2 * | 9/2017 | Park | H04W 8/005 |
| 9,974,056 B2 * | 5/2018 | Chang | H04W 72/0406 |
| 10,142,146 B2 | 11/2018 | Kim | |
| 10,142,152 B2 * | 11/2018 | Park | H04L 27/2613 |
| 10,574,375 B2 | 2/2020 | Michael et al. | |
| 2002/0041592 A1 * | 4/2002 | Van Der Zee | H04L 69/163 370/389 |
| 2003/0069988 A1 * | 4/2003 | Rune | H04W 99/00 709/237 |
| 2003/0081603 A1 * | 5/2003 | Rune | H04W 72/1289 370/390 |
| 2004/0237024 A1 * | 11/2004 | Limberg | H04L 27/3416 714/784 |
| 2008/0044012 A1 * | 2/2008 | Ekberg | H04W 12/033 380/30 |
| 2009/0154897 A1 * | 6/2009 | Mizuno | H04N 7/0112 386/232 |
| 2009/0201949 A1 * | 8/2009 | Sunahara | H04N 21/4385 370/474 |
| 2009/0228764 A1 * | 9/2009 | Lee | H03M 13/356 714/776 |
| 2009/0300682 A1 | 12/2009 | Kim | |
| 2010/0043038 A1 | 2/2010 | Li | |
| 2010/0134256 A1 * | 6/2010 | Mihota | H04B 3/142 340/10.1 |
| 2011/0188765 A1 * | 8/2011 | Fukuhara | G06K 9/36 382/233 |
| 2012/0026041 A1 | 2/2012 | Murdock | |
| 2012/0300877 A1 * | 11/2012 | Murakami | H04L 25/03942 375/296 |
| 2012/0327955 A1 * | 12/2012 | Herrmann | H04N 21/2389 370/476 |
| 2013/0145159 A1 * | 6/2013 | Nakaoka | H04L 9/3247 713/161 |
| 2013/0205343 A1 | 8/2013 | Kirby | |
| 2013/0215910 A1 | 8/2013 | Inomata | |
| 2013/0219431 A1 * | 8/2013 | Hong | H04N 21/234327 725/54 |
| 2014/0133330 A1 * | 5/2014 | Chapman | H04L 69/323 370/252 |
| 2014/0161209 A1 * | 6/2014 | Limberg | H04L 5/0016 375/299 |
| 2014/0177731 A1 * | 6/2014 | Limberg | H03M 13/1515 375/240.25 |
| 2014/0269778 A1 | 9/2014 | Yang | |
| 2014/0298397 A1 * | 10/2014 | Pichot | H04N 21/242 725/116 |
| 2014/0348138 A1 | 11/2014 | Ono | |
| 2015/0010018 A1 * | 1/2015 | Yang | H04H 20/72 370/474 |
| 2015/0033271 A1 * | 1/2015 | Lee | H04N 21/858 725/93 |
| 2015/0113577 A1 * | 4/2015 | Yie | H04N 21/47202 725/109 |
| 2015/0181003 A1 | 6/2015 | Kim et al. | |
| 2015/0189614 A1 * | 7/2015 | Tian | H04W 56/0015 370/350 |
| 2015/0230105 A1 * | 8/2015 | Negus | H04W 72/082 370/329 |
| 2015/0334708 A1 * | 11/2015 | Lee | H04L 1/0083 370/329 |
| 2015/0341052 A1 * | 11/2015 | Jeong | H03M 13/253 714/776 |
| 2015/0341054 A1 | 11/2015 | Myung et al. | |
| 2016/0088581 A1 * | 3/2016 | Lorenz | H04W 56/0065 455/456.1 |
| 2016/0127522 A1 * | 5/2016 | Yang | H04L 69/22 370/392 |
| 2016/0134532 A1 * | 5/2016 | Hwang | H04L 5/00 370/392 |
| 2016/0182976 A1 * | 6/2016 | Kwon | H04N 21/4345 725/118 |
| 2016/0191199 A1 * | 6/2016 | Hwang | H04L 12/18 370/474 |
| 2016/0212503 A1 * | 7/2016 | Kwon | H04N 21/845 |
| 2016/0226687 A1 | 8/2016 | Kim et al. | |
| 2016/0226689 A1 * | 8/2016 | Kim | H03M 13/2906 |
| 2016/0227005 A1 * | 8/2016 | Kwon | H04H 60/73 |
| 2016/0337486 A1 * | 11/2016 | Kwon | H04N 21/2381 |
| 2016/0359803 A1 * | 12/2016 | Kwon | H04L 45/745 |
| 2017/0111692 A1 | 4/2017 | An et al. | |
| 2017/0126558 A1 * | 5/2017 | Kwon | H04H 60/07 |
| 2017/0164017 A1 * | 6/2017 | Hwang | H04N 21/64322 |
| 2017/0187557 A1 * | 6/2017 | Zhang | H04L 25/0202 |
| 2017/0207867 A1 * | 7/2017 | Kwon | H04W 4/90 |
| 2017/0238315 A1 | 8/2017 | Lee et al. | |
| 2018/0048410 A1 * | 2/2018 | Michael | H04L 65/607 |
| 2018/0077471 A1 * | 3/2018 | Takahashi | H04N 21/6143 |
| 2018/0131457 A1 * | 5/2018 | Michael | H04N 21/4344 |
| 2019/0306286 A1 * | 10/2019 | Yang | H04L 69/22 |

OTHER PUBLICATIONS

"MMT-Based Media Transport Scheme in Digital Broadcasting Systems, ARIB STD-B60, Ver. 1.0", Arib Standard, Arib Association of Radio Industries and Businesses, JP, vol. ARIB, STD-B60, Ver. 1.0, Jul. 31, 2014, pp. 1-197.

Partial Supplementary European Search Report dated Aug. 1, 2018 in corresponding European Patent Application No. 16758783.1, 13 pages.

International Search Report dated Mar. 29, 2016 in PCT/JP2016/055041.

ARIB Standard, "ARIB STD-B44 2.0 Edition," Association of Radio Industries and Businesses, Jul. 31, 2014, 164 pages.

Yoichi Suzuki et al., "Development of Transmitter and Receiver Capable of Transmission of UTC Information Using the Expansion Field of TMCC Signal", IEICE Communications Society Conference, Sep. 2, 2014, pp. 149 and English Translation (5 pages).

"Digital Hoso ni Okeru MMT ni yoru Media Transport Hoshiki", ARIB STD-B60 1. 0 edition, Association of Radio Industries and Businesses, Jul. 31, 2014, pp. 29-38 and English Translation (20 pages).

Chang, Kapseok, et al., "ETRI PHY Proposal for PAC", Project: IEEE P802.15 Working Group for Wireless Personal Area Network (WPANs), doc.: IEEE 802.15-14-0250-00-0008, May 5, 2014, 31 pages.

(56) References Cited

OTHER PUBLICATIONS

Korean Office Action dated Feb. 24, 2022 in Korean Patent Application No. 10-2017-7021128 (with English translation), 7 pages.

* cited by examiner

FIG.7

| Packet Type Value | Meaning |
|---|---|
| 000 | IPv4 |
| 001 | Compressed IP Packet |
| 010 | MPEG-2 Transport Stream |
| 011 | Reserved |
| 100 | Signaling |
| 101 | Reserved |
| 110 | Reserved |
| 111 | Extension |

FIG.12

| EXT_TYPE | Description |
|---|---|
| 000 | Stuffing bytes only(size=EXT_LEN) |
| 001 | ORDER INFORMATION |
| : | |
| 111 | Reserved | ic
TRANSMISSION DEVICE, TRANSMISSION METHOD, RECEPTION DEVICE, AND RECEPTION METHOD

CROSS-REFERENCE TO RELATED APPLICATIONS

This application is a continuation of U.S. application Ser. No. 15/552,376, filed Aug. 21, 2017, which is a National Stage of PCT/JP2016/055041, filed Feb. 22, 2016, and claims the benefit of priority from Japanese Application No. 2015-042247, filed Mar. 4, 2015, the entire contents of each of which are incorporated herein by reference.

TECHNICAL FIELD

The present technology relates to a transmission device, a transmission method, a reception device, and a reception method, and relates particularly to a transmission device, a transmission method, a reception device, and a reception method that permit efficient transfer of time and other information.

BACKGROUND ART

With advanced television systems committee (ATSC)3.0, one of next-generation terrestrial broadcasting standards, for example, it has been determined that internet protocol (IP) packet including UDP/IP, i.e., user datagram protocol (UDP) packet, rather than transport stream (TS) packet will be used for data transmission. There are expectations that IP packet will be used in the future not only in ATSC3.0 but also in other broadcasting schemes.

It should be noted that when TS is broadcast, program clock reference (PCR) is transmitted as time information for synchronizing the transmitting and receiving sides (refer, for example, to NPL 1).

CITATION LIST

Non Patent Literature

[NPL 1]
"ARIB STD-B44 2.0 Edition," Association of Radio Industries and Businesses (general incorporated association)

SUMMARY

Technical Problems

If time information is transmitted to synchronize the transmitting and receiving sides in a broadcasting scheme such as ATSC3.0, efficient transmission of that time information is required.

Efficient transmission of information as overhead other than time information is also required.

The present technology has been devised in light of such circumstances, and an object of the present technology is to permit efficient transmission of time and other information.

Solution to Problems

A first transmission device of the present technology is a transmission device that includes a generation section and a transmission section. The generation section generates a physical layer frame having preambles and a payload that includes, in the preamble, time information representing time of a given position in a stream of physical layer frames. The transmission section sends the physical layer frame.

A first transmission method of the present technology is a transmission method that includes generation and transmission of a physical layer frame. The physical layer frame has preambles and a payload and includes, in the preamble, time information representing time of a given position in a stream of physical layer frames.

In the first transmission device and the first transmission method of the present technology, a physical layer frame having preambles and a payload is generated and transmitted. The physical layer frame includes, in the preamble, time information representing time of a given position in a stream of physical layer frames.

A first reception device of the present technology is a reception device that includes a reception section and a processing section. The reception section receives a physical layer frame having preambles and a payload that includes, in the preamble, time information representing time of a given position in a stream of the physical layer frames. The processing section performs processes using the time information included in the preamble of the physical layer frame.

A first reception method of the present technology is a reception method that includes reception of a physical layer frame and performance of processes. The physical layer frame has preambles and a payload and includes, in the preamble, time information representing time of a given position in a stream of the physical layer frames. Processes are performed using the time information included in the preamble of the physical layer frame.

In the first reception device and the first reception method of the present technology, a physical layer frame having preambles and a payload is received that includes, in the preamble, time information representing time of a given position in a stream of the physical layer frame, and processes are performed using the time information included in the preamble of the physical layer frame.

A second transmission device of the present technology is a transmission device that includes a generation section and a transmission section. The generation section generates a BB (BaseBand) frame that includes, in a BB header, order information on BB frame order. The transmission section sends the BB frame.

A second transmission method of the present technology is a transmission method that includes generation of a BB (BaseBand) frame and transmission of the BB frame. The BB frame includes, in a BB header, order information on BB frame order.

In the second transmission device and the second transmission method of the present technology, a BB (BaseBand) frame is generated and transmitted. The BB frame includes, in a BB header, order information on BB frame order.

A second reception device of the present technology is a reception device that includes a reception section and a processing section. The reception section receives a BB (BaseBand) frame that includes, in a BB header, order information on BB frame order. The processing section performs processes using the order information included in the BB header of the BB frame.

A second reception method of the present technology is a reception method that includes reception of a BB (Base-Band) frame and performance of processes. The BB frame includes, in a BB header, order information on BB frame order. Processes are performed using the order information included in the BB header of the BB frame.

In the second reception device and the second reception method of the present technology, a BB (BaseBand) frame is received that includes, in a BB header, order information on BB frame order, and processes are performed using the order information included in the BB header of the BB frame.

It should be noted that the transmission device and the reception device may be independent devices. Alternatively, the transmission device and the reception device may be internal blocks making up a single device.

Advantageous Effect of Invention

According to the present technology, it is possible to efficiently transmit time and other information.

It should be noted that the effect described here is not restrictive and may be any one of the effects described in the present disclosure.

BRIEF DESCRIPTION OF DRAWINGS

FIG. 7 is a diagram describing type information of a generic packet.

FIG. 12 is a diagram describing extension type information (EXT_TYPE) if order information may be included in a BB header of a BB frame.

DESCRIPTION OF EMBODIMENTS

<Embodiment of the Transmission System to which the Present Technology is Applied>

Figure 1:
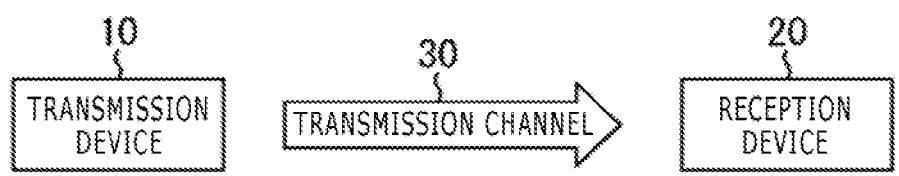
FIG. 1 is a block diagram illustrating a configuration example of an embodiment of a transmission system to which the present technology is applied.

FIG. 1 is a block diagram illustrating a configuration example of an embodiment of a transmission system to which the present technology is applied.

In FIG. 1, the transmission system includes a transmission device 10 and a reception device 20.

The transmission device 10 sends, for example, services such as programs (digital broadcasting and data transmission). That is, the transmission device 10 sends (transmits) a stream of target data to be sent such as image and sound data as components making up a service such as program (television broadcast program) as a digital broadcasting signal via a transmission channel 30.

The reception device 20 receives the digital broadcasting signal sent via the transmission channel 30 from the transmission device 10, restores the signal to its original stream, and outputs the stream. For example, the reception device 20 outputs image and sound data as components making up a service such as program.

It should be noted that the transmission system in FIG. 1 is applicable to data transmission compliant with ATSC standards, DVB, integrated services digital broadcasting (ISDB), and so on and to other kinds of data transmission. On the other hand, terrestrial waves, satellite circuits, cable television networks (wired networks), and so on can be used as the transmission channel 30.

<Protocol Stack>

Figure 2:
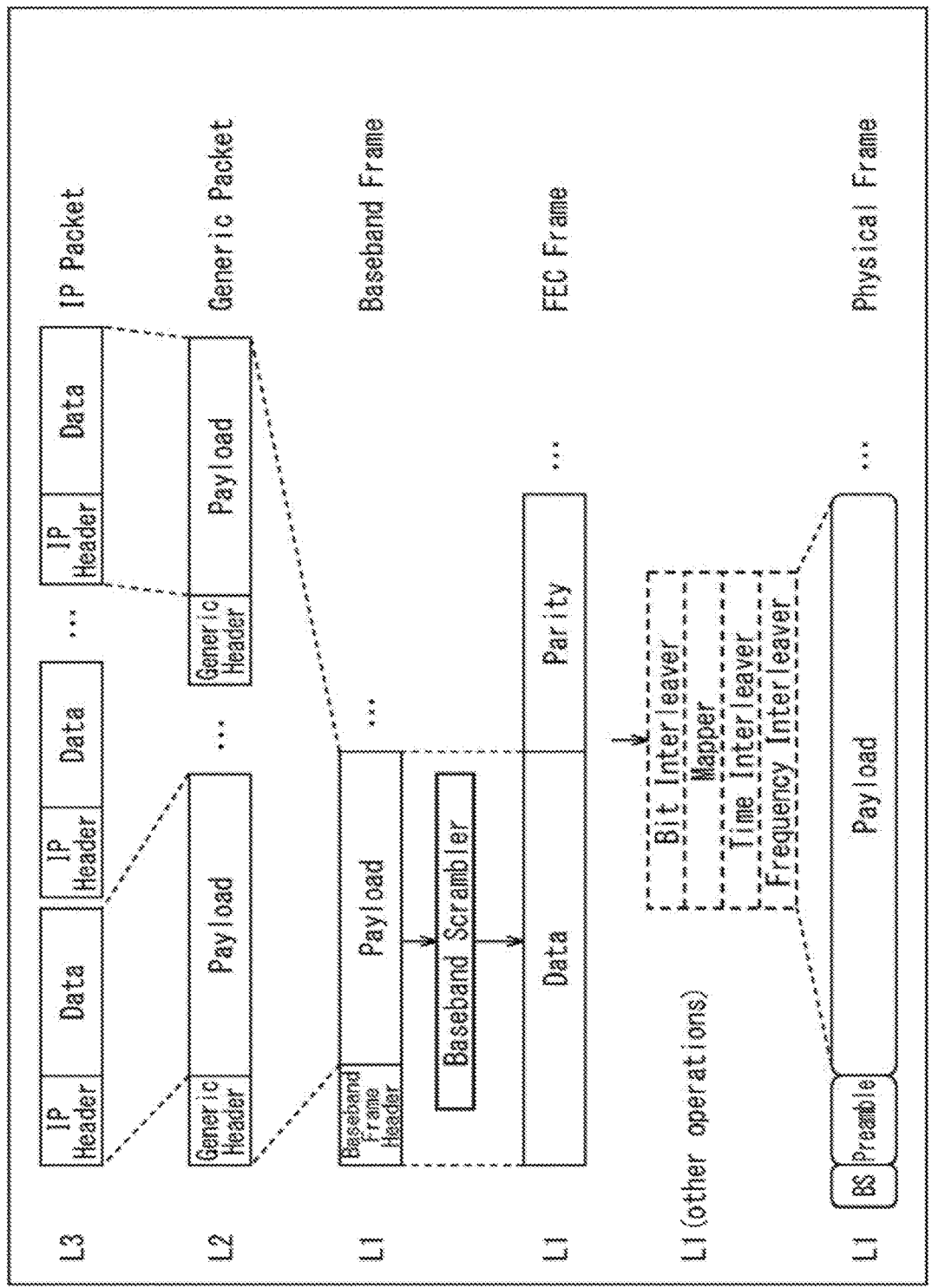
FIG. 2 is a diagram illustrating an example of a protocol stack for broadcasting handled by the transmission system.

FIG. 2 is a diagram illustrating an example of a protocol stack for broadcasting handled by the transmission system shown in FIG. 1.

That is, FIG. 2 illustrates a structure of data (packets and frames) handled by the transmission system shown in FIG. 1.

Data in a first layer (physical layer) L1, a second layer (datalink layer) L2, and a third layer (network layer) L3 of the open systems interconnection (OSI) reference model is handled by the transmission system.

In FIG. 2, an IP packet (IP Packet) is data in the third layer L3, and a generic packet (Generic Packet) is data in the second layer L2. A BB frame (Baseband Frame), an FEC frame (FEC Frame), and a physical layer frame (Physical Frame) are data in the first layer L1.

In the transmission system shown in FIG. 1, data broadcasting is conducted by using an IP packet.

An IP packet includes an IP header (IP Header) and data (Data). Image, sound, and other data is placed in the IP packet data.

In the transmission device 10, a generic packet is configured (generated) from an IP packet.

The generic packet includes a generic header (Generic Header) and a payload (Payload). One or a plurality of IP packets are placed in the payload of the generic packet.

In the transmission device 10, a BB frame is configured from a generic packet.

The BB frame includes a BB header (Baseband Frame Header) and a payload (Payload). One or a plurality of generic packets are placed in the payload of the BB frame.

In the transmission device 10, an FEC frame is configured by scrambling one or a plurality of BB frames as necessary and adding a physical layer error correction parity (Parity) to the BB frames.

Further, in the transmission device 10, physical layer processes such as bit interleaving, mapping to signal points in the constellation, and interleaving in a time direction and in a frequency direction are performed on one or a plurality of FEC frames as necessary. Then, in the transmission device 10, a physical layer frame is configured by adding a preamble to the FEC frames that have undergone the physical layer processes.

That is, the physical layer frame includes preambles (BS, Preamble) and a payload (Payload). An FEC frame is placed in the physical layer frame payload.

In FIG. 2, the physical layer frame has, for example, "BS (BootStrap)" and "Preamble" as preambles as does an ATSC3.0's ATSC frame.

Here, "BS" is also referred to as a first preamble BS, and "Preamble" is also referred to as a second preamble Preamble.

The first preamble BS corresponds, for example, to a P1 symbol making up a DVB-T.2's T2 frame, and the second preamble Preamble corresponds, for example, to a P2 symbol making up a T2 frame.

On the other hand, the payload of the physical layer frame corresponds, for example, to a data symbol making up a T2 frame.

The physical layer frame structure used in DVB-T2 and ATSC3.0 has a length of approximately 100 to 200 ms. As for the physical layer frame, a payload that follows preambles can be acquired after acquiring the preambles.

That is, the reception device 20 receives a physical layer frame and demodulates the preambles of that physical layer frame. Further, the reception device 20 processes the payload of the physical layer frame using the preambles of the physical layer frame and restores the FEC frame, the BB frame, the generic packet, and the IP packet in this order from the physical layer frame.

It should be noted that processing the payload of the physical layer frame requires preambles of that physical layer frame. Therefore, if reception begins from halfway through the physical layer frame in the reception device 20, data received until the emergence of a next preamble after the start of reception is discarded.

<Time Information>

Figure 3:
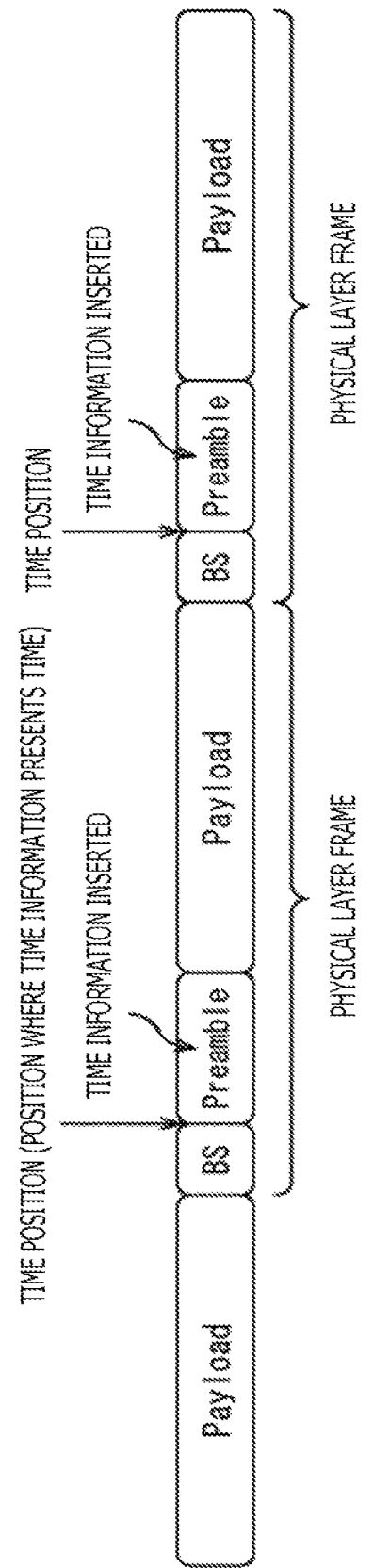
FIG. 3 is a diagram describing time information.

FIG. 3 is a diagram describing time information.

In the transmission system shown in FIG. 1, a physical layer frame is configured from an IP packet in the transmission device 10, and a stream of the physical layer frames is sent to the reception device 20 as described in FIG. 2.

In an IP packet, time information like TS's PCR is not transmitted. In order to synchronize the transmission device 10 and the reception device 20, it is preferred that time information be included in a stream of physical layer frames.

For this reason, the transmission device 10 can include time information in a stream of physical layer frames.

Time information can be included in a preamble of a physical layer frame as illustrated in FIG. 3.

Here, approximately 30 to 40 bits are, for example, assumed in ATSC3.0 as the first preamble BS of the preambles of the physical layer frame. Therefore, the first preamble BS may not have a sufficient bit length to include time information.

For this reason, time information can be included in the second preamble Preamble of the preambles of the physical layer frame.

Time information represents absolute time of a given position in a stream of physical layer frames. Time of a given position in a stream is the time of a given moment in the middle of processing of the bit at the given position by the transmission device 10. Among examples of the time of a given moment in the middle of processing of the bit at the given position by the transmission device 10 are the time of the moment when the bit at the given position is output from a certain block of the transmission device 10 and the time of the moment when the bit at the given position is processed by a certain block of the transmission device 10.

Here, a given position in a stream of physical layer frames where time information represents time will be referred to as a time position.

A starting position of the physical layer frame having a preamble including time information (starting position of the first preamble BS), for example, can be used as a time position.

Also, the boundary position of the physical layer frame having a preamble including time information between the first preamble BS and second preamble Preamble (ending position of the first preamble BS) (starting position of the second preamble Preamble), for example, can be used as a time position.

Further, the ending position of the second preamble Preamble of the physical layer frame having a preamble including time information, for example, can be used as a time position.

In addition to the above, an arbitrary position of the physical layer frame can be used as a time position.

It should be noted that sampling frequencies of the first preamble BS and the second preamble Preamble and beyond may be different in the physical layer frame. If the sampling frequencies of the first preamble BS and the second preamble Preamble and beyond are different, time is counted in different manners in the first preamble BS and the second preamble Preamble and beyond. Therefore, if the starting position of the first preamble BS is used as a time position, it may be necessary to change the manner in which time is counted with respect to that time position during the first preamble BS and the second preamble Preamble and beyond. On the other hand, if the starting position of the second preamble Preamble is used as a time position, it is not necessary to change the manner in which time is counted with respect to that time position, that is, the manner in which time is counted during the second preamble Preamble and beyond.

For this reason, the starting position of the second preamble Preamble of the physical layer frame having a preamble including time information (boundary position between the first preamble BS and the second preamble Preamble) is used as a time position in FIG. 3.

The preambles (first preamble BS and second preamble Preamble) are located at a fixed position of each physical layer frame, i.e., at the start thereof, and the preambles are always processed first during processing of the physical layer frame. Therefore, it is easy for the reception device 20 to acquire and process time information included in a preamble.

Also, preambles are transmitted comparatively robustly, making it possible to transmit such preambles comparatively robustly.

Here, time information defined by NTP, time information defined by third generation partnership project (3GPP), time information defined by precise time protocol (PTP), time information included in global positioning system (GPS), and arbitrary time information such as time information in a uniquely determined format can be used as time information.

Figure 4:
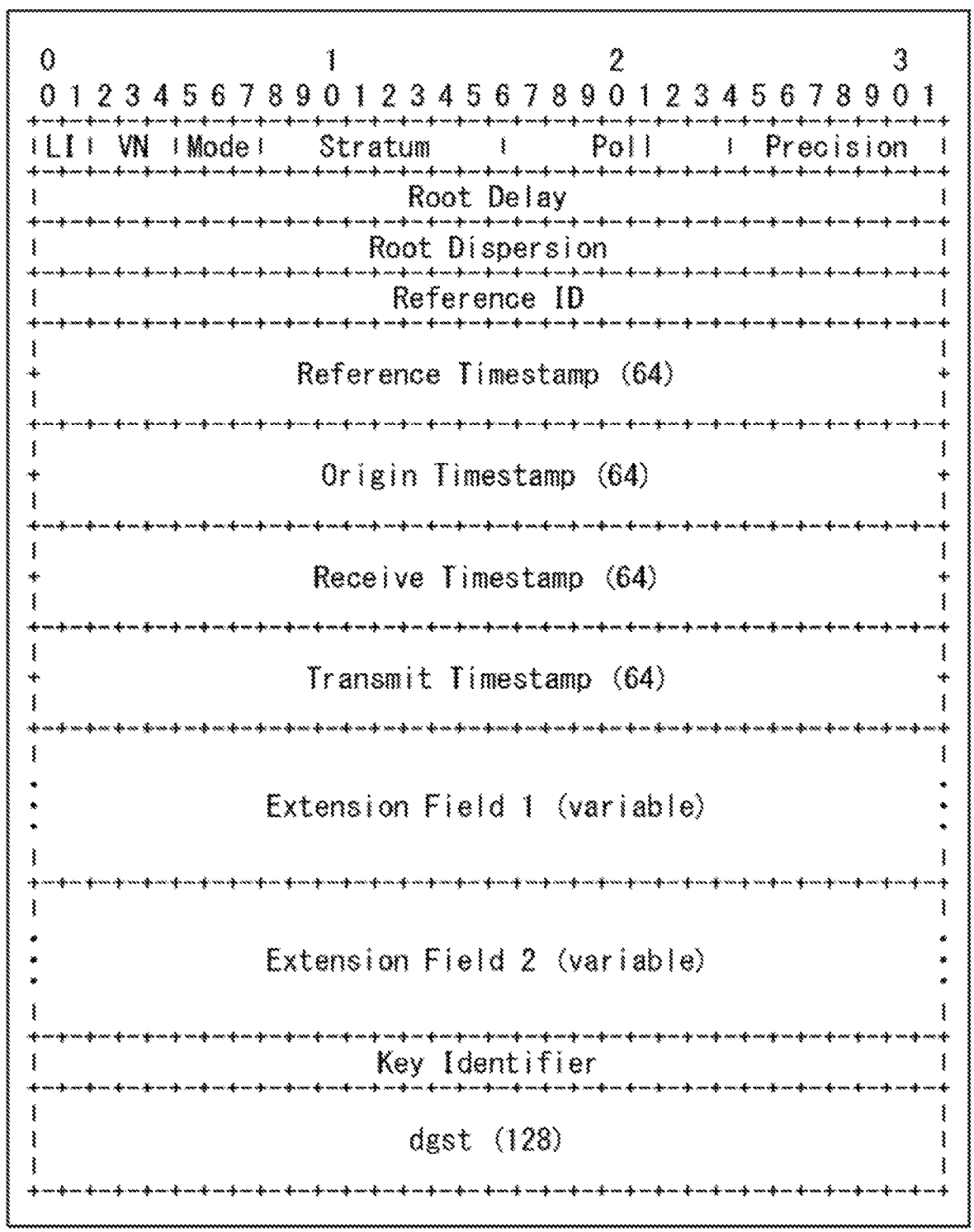
FIG. 4 is a diagram illustrating a network time protocol (NTP) packet format.

FIG. 4 is a diagram illustrating an NTP packet format.

The 2-bit LI is the abbreviation for Leap Indicator and indicates that a leap second will be inserted or deleted in the last minute of the current month. The 3-bit VN is the abbreviation for Version Number and indicates an NTP version. The 3-bit Mode indicates an NTP operation mode.

The 8-bit Stratum indicates the level and is coded in accordance with the level. The 8-bit Poll indicates the maximum interval between consecutive NTP messages (in seconds) as a polling interval. The 8-bit Precision indicates the system clock precision (in seconds).

Root Delay indicates, as a root delay, the round-trip delay until reference time in NTP short format. Root Dispersion indicates the total delay dispersion until reference time in NTP short format. Reference ID indicates the identifier representing reference time. In a broadcasting system, "0000" indicating NULL can be stored.

Reference Timestamp indicates, as a reference timestamp, the time when system time was corrected last in NTP long format. Origin Timestamp indicates, as a start timestamp, the time when a request was sent from a client to a server in NTP long format. "0" can be stored in a broadcasting system.

Receive Timestamp indicates, as a reception timestamp, the server time when a request was received from a client in NTP long format. "0" can be stored in a broadcasting system. Transmit Timestamp indicates, as a transmission timestamp, the server time when a response was sent to a client in NTP long format.

In addition to the above, an NTP packet has Extension Field 1 and Field 2, extension fields, and moreover has, as necessary, Key Identifier and dgst (message digest).

As time information, 64-bit time information represented in the same format as timestamps such as NTP packet's Reference Timestamp can be used.

Here, there is a problem of time discontinuity caused by leap second with 64-bit time of NTP packet's timestamp. However, 64-bit time has sufficient granularity as time information included in the physical layer frame.

Also, in addition to NTP packet's timestamp, time information defined by 3GPP, i.e., timeInfo-r11 that is time information defined, for example, by 3GPP TS 36 331, can be used as time information.

timeInfo-r11 is 56 bits and includes 39-bit timeInfoUTC-r11, 2-bit dayLightSavingTime-r11, 8-bit leapSeconds-r11, and 7-bit localTimeOffset-r11. Although timeInfo-r11 lacks granularity to some extent as time information included in the physical layer frame, no leap second problem occurs.

In addition, 80 bits representing time defined by Institute of Electrical and Electronics Engineers (IEEE)1588 can be used as time information for time information defined by PTP, i.e., PTP packet. 48 bits of the 80 bits representing time of a PTP packet represent time in seconds, and the remaining 32 bits represent time in nanoseconds. Therefore, time information defined by PTP has sufficient granularity as time information included in the physical layer frame and can represent precise time. Time information preferably represents time with more precision from the viewpoint of reproducing precise time in the reception device 10, and if time information defined by PTP is used as time information included in the physical layer frame, it is possible to transmit precise time information and reproduce precise time in the reception device 10. Further, no leap second problem occurs with time information defined by PTP.

<Placement Position of Time Information>

Figure 5:
FIG. 5 is a diagram describing an example of a position where time information is placed.

FIG. 5 is a diagram describing an example of a position where time information is placed.

Although, in FIG. 3, time information is placed (included) in the preamble of the physical layer frame, time information may be placed, for example, in the payload of the physical layer frame as well as in the preamble of the physical layer frame.

In FIG. 5, time information is placed at the starting portion of the payload of the physical layer frame.

If time information is placed at the starting portion of the payload of the physical layer frame, the reception device 20 can acquire time information placed at the start of the payload after processing the preambles of the physical layer frame (first preamble BS and second preamble Preamble).

<First Placement Example in which Time Information is Placed in the Payload>

Figure 6:
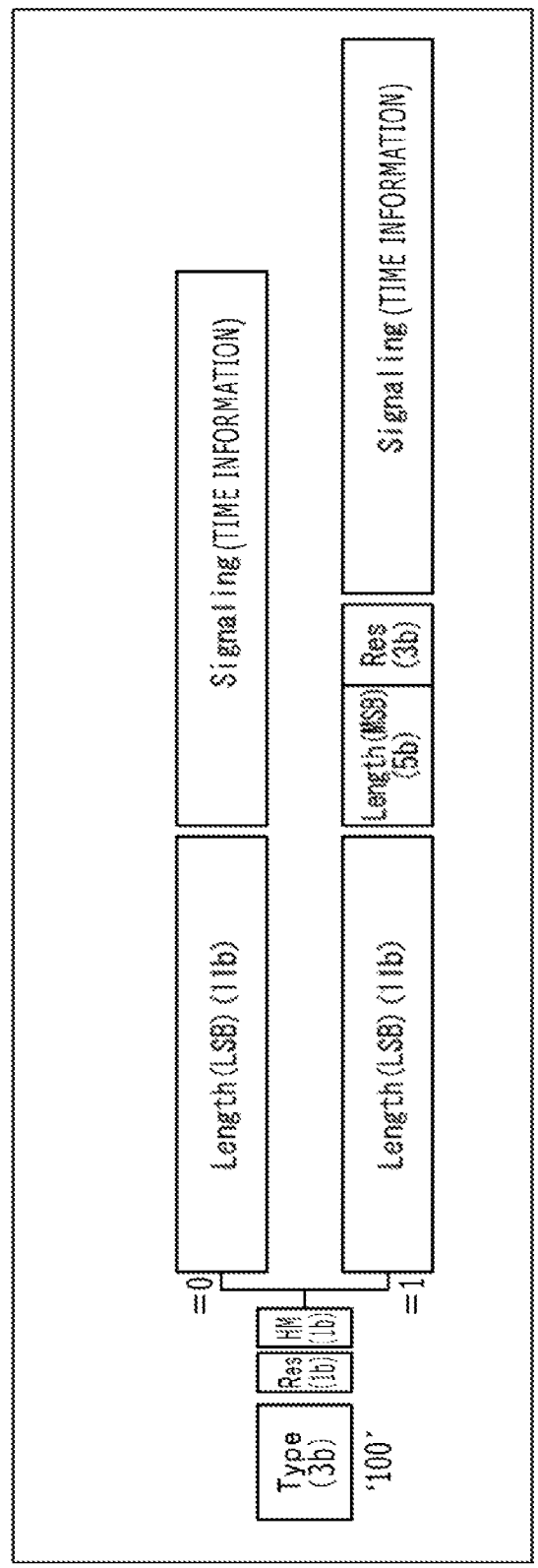
FIG. 6 is a diagram describing a first placement example in which time information is placed at the start of a payload of a physical layer frame.

FIG. 6 is a diagram describing a first placement example in which time information is placed at the start of the payload of the physical layer frame.

In the first placement example, time information is placed in the payload of the generic packet at the start of the BB frame that is at the start of the payload of the physical layer frame as the start of the payload of the physical layer frame.

FIG. 6 illustrates a configuration example of a generic packet.

In the generic packet shown in FIG. 6, 3-bit type information (Type) is set at the start of the generic header. In this type information, information on the type of data placed in the payload of the generic packet is set.

If time information and other signaling information for signaling purposes is placed in the payload of the generic packet, "100" is, for example, set in the type information of the generic header. Also, the type information in which "100" is set is followed by a 1-bit reserved area (Res: Reserved) in the generic header, and a header mode (HM: Header Mode) is placed next.

If "0" is set as the header mode, 11-bit length information (Length (LSB)) is placed thereafter. This length information is set to be the length of the generic packet's payload. On the other hand, if "1" is set as the header mode, 16-bit length information in total made up of 11-bit length information (Length (LSB)) and 5-bit length information (Length (MSB)) is placed thereafter, and further a 3-bit reserved area (Res) is provided.

If "0" is set as the header mode, the length information (Length (LSB)) is 11 bits long, and a value in the range from 0 to 2047 ($=2^{11}-1$) bytes can be represented as a payload length of the generic packet. However, 11-bit length information cannot represent a payload length beyond 2048 bytes. For this reason, if data equal to or more than 2048 bytes is placed in the payload, "1" is set as the header mode. In this case, one byte is added as a generic header area, thus providing 16-bit length information. A payload length equal to or more than 2048 bytes can be represented by this 16-bit length information.

In the generic packet, a payload is placed following the generic header configured as described above. Here, "100" is set as generic header type information. Therefore, signaling information including time information is placed as a payload.

FIG. 7 is a diagram describing type information of the generic packet shown in FIG. 6.

If an IPv4 IP packet is placed in the payload of the generic packet, "000" is set as type information. Also, if a compressed IP packet is placed in the payload, "001" is set as type information. Further, if a moving picture experts group (MPEG)2-TS scheme's TS packet is placed in the payload, "010" is set as type information.

Also, if signaling information such as time information is placed in the payload, "100" is set as type information. It should be noted that three values of type information, namely, "011," "101," and "110," are undefined (Reserved) in FIG. 7. Also, if three values of undefined (Reserved) type information alone lead to insufficient extension of type information, (the range of) type information can be further extended by setting "111" as type information.

<Second Placement Example in which Time Information is Placed in the Payload>

Figure 8:
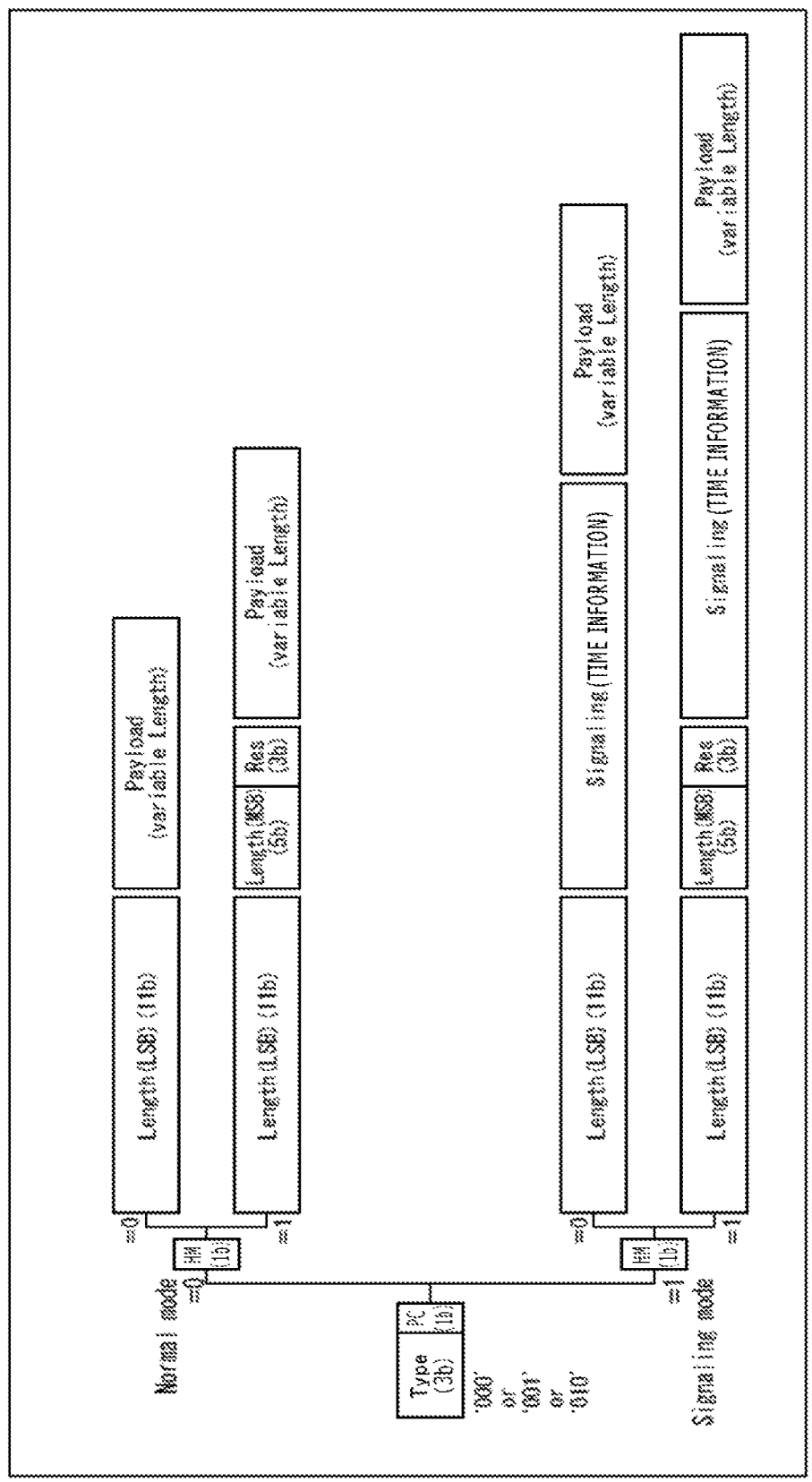
FIG. 8 is a diagram describing a second placement example in which time information is placed at the start of the payload of the physical layer frame.

FIG. 8 is a diagram describing a second placement example in which time information is placed at the start of the payload of the physical layer frame.

In the second placement example, time information is placed in the header of the generic packet at the start of the BB frame that is at the start of the payload of the physical layer frame as the start of the payload of the physical layer frame.

FIG. 8 illustrates a configuration example of a generic packet.

As described in FIG. 6, type information on the type of data placed in the payload of the generic packet is set in 3-bit type information (Type) at the start of the generic header in the generic packet.

In the second placement example, "000," "001," or "010" is set as 3-bit type information in the generic header.

As described in FIG. 7, if "000" is set as type information, an IPv4 IP packet is placed in the payload, and if "001" is set, a compressed IP packet is placed in the payload. Also, if "010" is set as type information, a TS packet is placed in the payload.

In the generic header, 1-bit packet setup information (PC: Packet Configuration) is placed following type information in which "000," "001," or "010" is set. If "0" is set as packet setup information, the generic header assumes normal mode (Normal mode), and 11-bit length information (Length) or 16-bit length information and a 3-bit reserved area (Res) are placed in accordance with the header mode (HM) placed following the packet setup information. Then, an IPv4 IP, a compressed IP, or a TS packet is placed in the payload following the generic header in accordance with the type information of the generic header.

On the other hand, if "1" is set as a packet setup information (PC), the generic header assumes signaling mode (Signaling mode), and length information (Length) is placed in accordance with the header mode (HM) placed following the packet setup information. That is, if "0" is set as the header mode, 11-bit length information (Length (LSB)) is placed thereafter. Further, the generic header is extended, and signaling information (Signaling) including time information is placed following the length information.

Also, if "1" is set as packet setup information (PC), and when "1" is set as the header mode (HM), 16-bit length information and a 3-bit reserved area (Res) are placed following the header mode. Further, the generic header is extended, and signaling information (Signaling) including time information is placed following the reserved area (Res).

Information up to the above signaling information (Signaling) is a generic header (extended header), and a payload is placed thereafter. An IPv4, a compressed IP, or other packet is placed in the payload in accordance with the generic header type information.

<Third Placement Example in which Time Information is Placed in the Payload>

Figure 9:
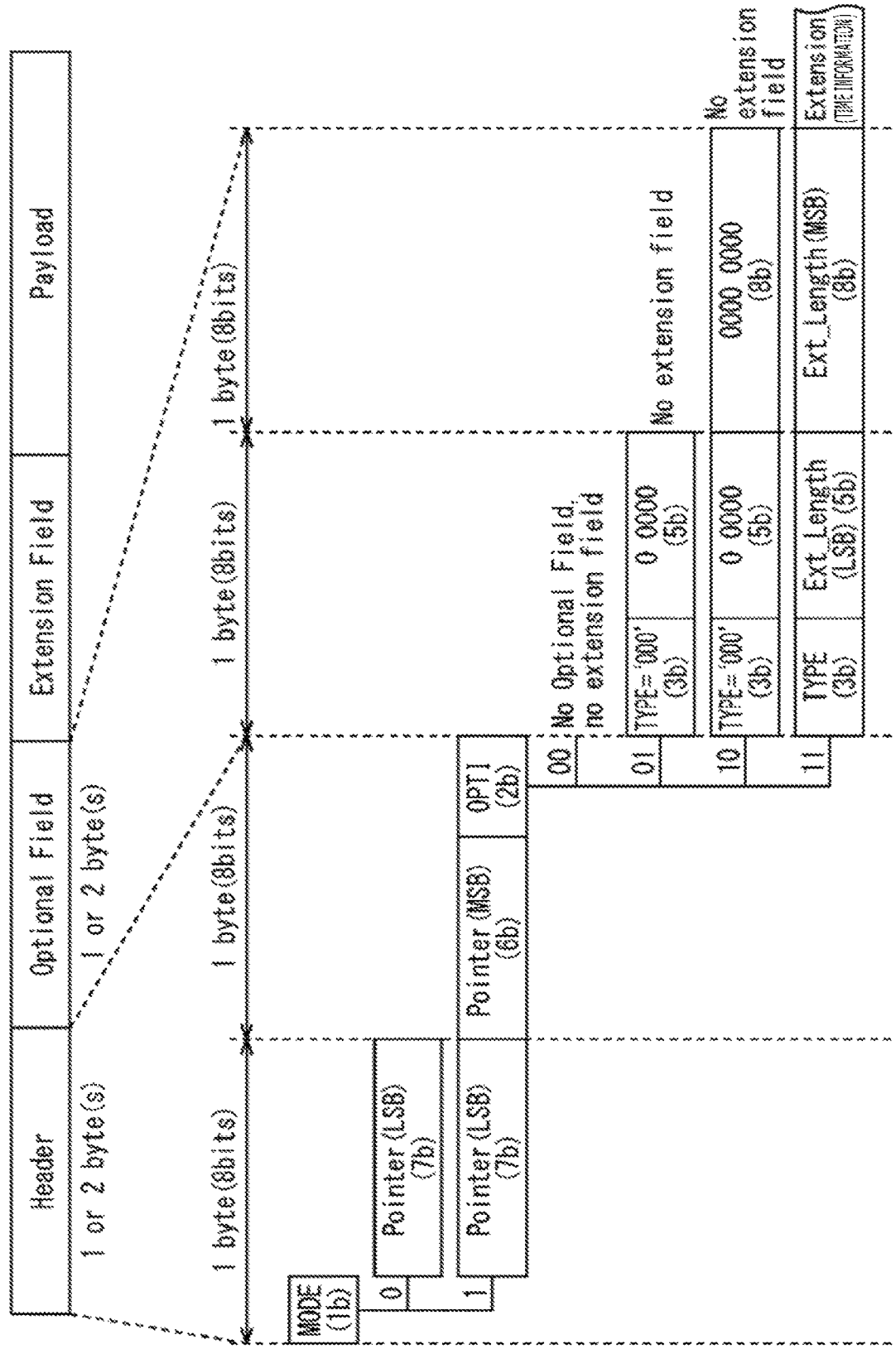
FIG. 9 is a diagram describing a third placement example in which time information is placed at the start of the payload of the physical layer frame.

FIG. 9 is a diagram describing a third placement example in which time information is placed at the start of the payload of the physical layer frame.

In the third placement example, time information is placed in the BB header of the BB frame at the start of the payload of the physical layer frame as the start of the payload of the physical layer frame.

FIG. 9 illustrates a configuration example of a BB frame.

In FIG. 9, the BB frame includes a BB header and a payload (Payload). In addition to a 1- or 2-byte header (Header), a 1- or 2-byte optional field (Optional Field), and an extension field (Extension Field) may be placed in the BB header.

A 1-bit mode (MODE) is set at the start of the header (Header).

If "0" is set as the 1-bit mode (MODE), 7-bit pointer information (Pointer (LSB)) is placed. It should be noted that pointer information is information intended to indicate the position of the generic packet placed in the payload of the BB frame. For example, if data of the generic packet placed last in a certain BB frame is placed in such a manner as to spread onto the next BB frame, it is possible to set position information of the generic packet placed at the start of the next BB frame.

Also, if "1" is set as the mode (MODE), 7-bit pointer information (Pointer (LSB)), 6-bit pointer information (Pointer (MSB)), and a 2-bit optional flag (OPTI: OPTIONAL) are placed. The optional flag is information intended to indicate whether the BB header is extended by placing an optional field (Optional Field) and an extension field (Extension Field).

If the optional field and the extension field are not extended, "00" is set as the optional flag. Also, if only the optional field is extended, "01" or "10" is set as the optional flag. It should be noted that if "01" is set as the optional flag, one byte (eight bits) is padded in the optional field. Also, if "10" is set as the optional flag, two bytes (16 bits) are padded in the optional field.

Also, if the optional field and the extension field are extended, "11" is set as the optional flag. In this case, 3-bit extension type information (TYPE(EXT_TYPE)) is set at the start of the optional field. Information on extension length information (EXT_Length(LSB)) and an extension field type (Extension type) placed following the extension type information is set in this extension type information.

In the third placement example, signaling information including time information is placed in the extension field (extension header).

That is, in the third placement example, "11" is set as the optional flag (OPTI), and the optional field and the extension field are extended. Further, "011" is set as extension type information (TYPE(EXT_TYPE)) of the optional field, and signaling information including time information is placed in the extension field.

Figure 10:
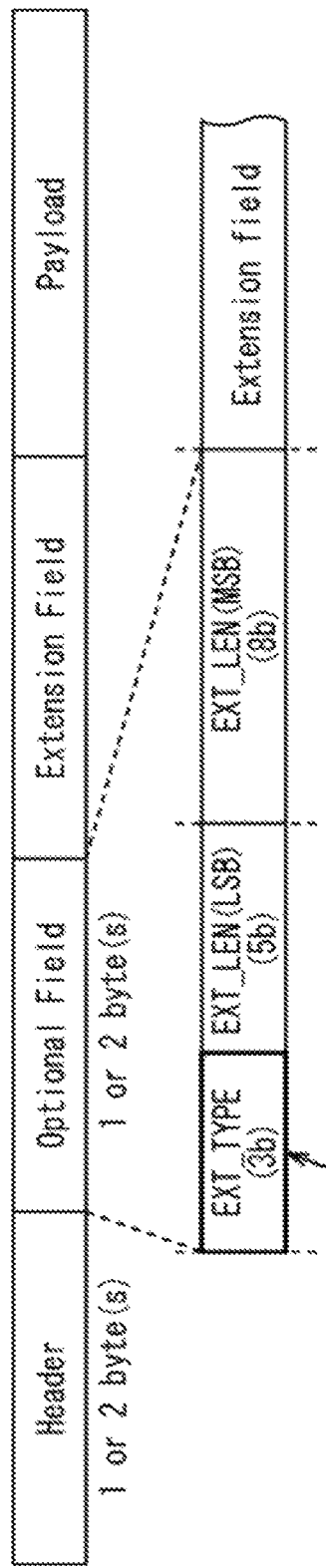
FIG. 10 is a diagram describing extension type information (EXT_TYPE).

FIG. 10 is a diagram describing extension type information (TYPE(EXT_TYPE)) shown in FIG. 9.

Information on extension length information (EXT_Length(LSB)) and an extension field type (Extension type) that are placed following the extension type information is set in the extension type information.

That is, if extension length information is placed, and if only stuffing bytes (Stuffing Bytes) are placed, "000" is set as the extension type information. Also, if ISSY (Input Stream Synchronizer) is placed in the extension field without placing any extension length information, "001" is set as the extension type information. Further, if extension length information is placed, and if stuffing bytes are placed in the extension field together with ISSY, "010" is set as the extension type information.

Also, if extension length information is placed, and if signaling information including time information is placed in the extension field, "011" is set as the extension type information. In this case, whether to place stuffing bytes is determined arbitrarily. It should be noted that extension type information from "100" to "111" is undefined (Reserved) in FIG. 10.

As described above, time information can be placed at the start of the payload of the physical layer frame.

<Order Information>

Figure 11:
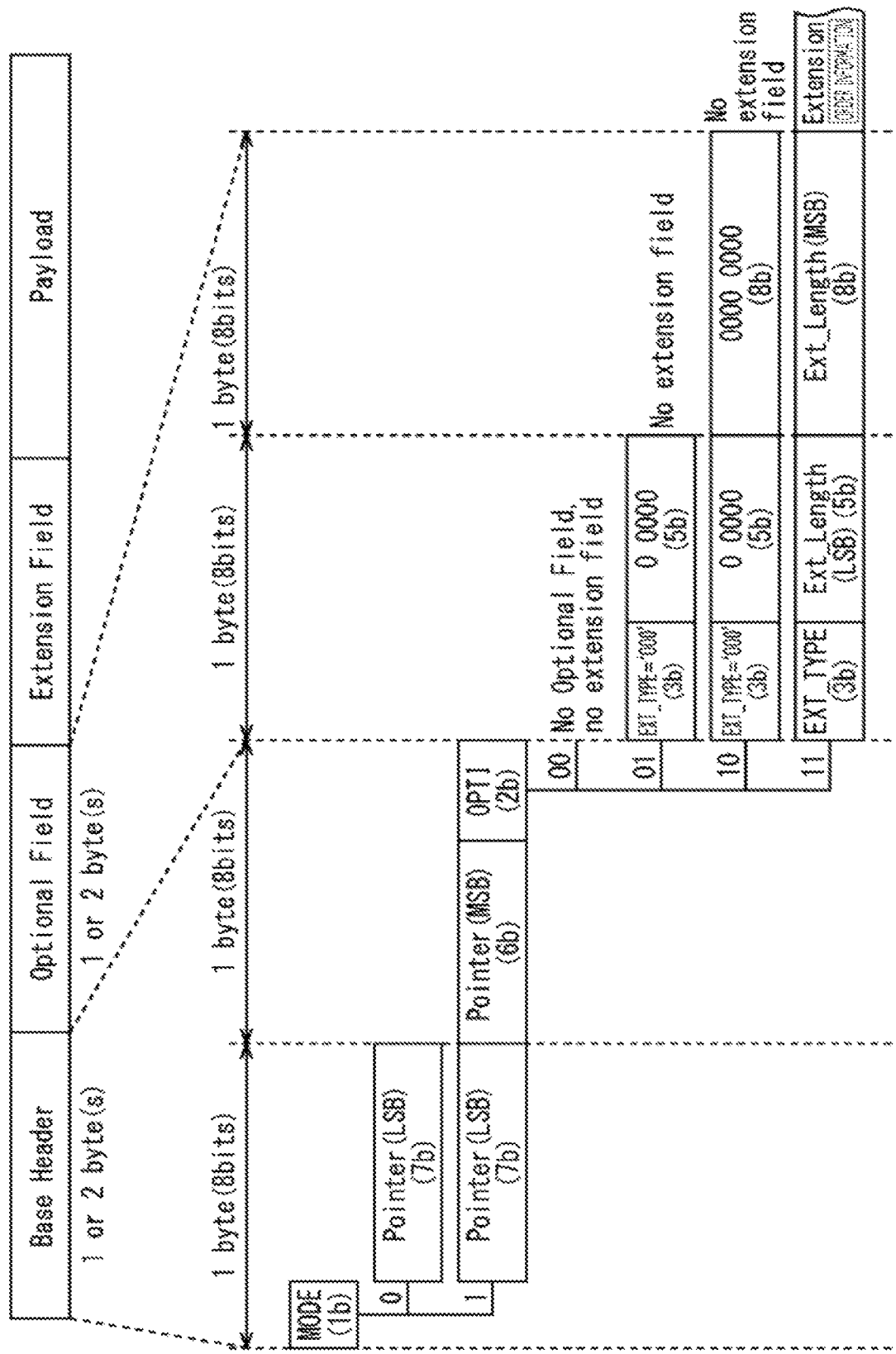
FIG. 11 is a diagram describing order information.

FIG. 11 is a diagram describing order information.

As for the transmission system shown in FIG. 1, it is preferred that the reception device 20 has an arrangement for processing BB frames in order.

For this reason, the transmission device 10 can include order information on BB frame order in BB frames.

Order information can be included in the BB header of the BB frame as illustrated in FIG. 11.

Here, we will assume below that time information is included, for example, in a preamble (first preamble BS or second preamble Preamble) of a physical layer frame as described in FIG. 3.

FIG. 11 illustrates a configuration example of a BB frame.

In FIG. 11, the BB frame includes a BB header and a payload (Payload).

The BB header includes a 1- or 2-byte header (Base Header).

Further, in addition to the header (Base Header), a 1- or 2-byte optional field (Optional Field) and an extension field (Extension Field) can be placed in the BB header.

A 1-bit mode (MODE) is set at the start of the header (Header).

If "0" is set as the 1-bit mode (MODE), 7-bit pointer information (Pointer (LSB)) is placed. As described in FIG. 9, pointer information indicates the position of the generic packet placed in the payload of the BB frame.

If "1" is set as the mode (MODE), 13=7+6-bit pointer information (Pointer (LSB) and Pointer (MSB)) and a 2-bit optional flag (OPTI: OPTIONAL) are placed.

The 13-bit pointer information includes 7-bit pointer information (Pointer (LSB)) and 6-bit pointer information (Pointer (MSB)). The 7-bit pointer information (Pointer (LSB)) and the 6-bit pointer information (Pointer (MSB)) represent the lower bit and the higher bit of the 13-bit pointer information, respectively. The optional flag indicates whether the header is extended by placing the optional field (Optional Field) and the extension field (Extension Field) as described in FIG. 9.

If the optional field and the extension field are not extended, "00" is set as the optional flag. Also, if only the optional field is extended, "01" or "10" is set as the optional flag.

3-bit extension type information (EXT_TYPE) on the extension field (Extension Field) is set at the start of the optional field.

If the optional flag is "01" or "10," the extension type information is set to "000." Further, 5-bit "00000" is set after the 3-bit extension type information "000" of the optional field.

If the optional flag is "10," 8-bit "00000000" is set following 3-bit extension type information "000" and 5-bit "00000."

If the optional flag is "11," extension type information is set in accordance with the extension field type (type of Extension field), and 5-bit EXT_Length(LSB) or that 5-bit EXT_Length(LSB) and 8-bit EXT_Length(MSB) are set following the extension type information.

EXT_Length(LSB) represents, for example, lower six bits of information on the extension field size, and EXT_Length (MSB) represents, for example, higher eight bits of information on the extension field size.

It should be noted that EXT_Length(MSB) does not exist if a given value is set as the extension type information (EXT_TYPE). If EXT_Length(MSB) exists, the extension field size is represented by 13 bits, the lower bits of which are 5-bit EXT_Length(LSB) and the higher bits of which are 8-bit EXT_Length(MSB). Also, if EXT_Length(MSB) does not exist, the extension field size is represented only by 5-bit EXT_Length(LSB).

If the optional field and the extension field are extended, "11" is set as the optional flag.

Then, order information is placed in the extension field (extension header) in accordance with the extension type information (EXT_TYPE).

That is, if order information is included in the BB header of the BB frame, the optional field and the extension field are extended by setting "11" as the optional flag (OPTI). Further, order information is placed in the extension field by setting, for example, "001" as extension type information (EXT_TYPE) of the optional field.

FIG. 12 is a diagram describing extension type information (EXT_TYPE) shown in FIG. 11 if order information may be included in a BB header of a BB frame.

In FIG. 12, if extension type information is "000," stuffing bytes (Stuffing Bytes), for example, are placed in the extension field (Extension Field).

Also, if extension type information is "001," order information, for example, is placed in the extension field (Extension Field).

In FIG. 12, extension type information having any other value is reserved (Reserved).

It should be noted that we assume that the generic packet placed in the payload of the BB frame is placed in order and that the IP packet placed in the payload of the generic packet is placed in order.

In this case, when the BB frame order is maintained by order information, the order of the generic packet placed in the payload of the BB frame is also maintained, and the order of the IP packet placed in the payload of the generic packet is also maintained.

<First Example of Order Information>

Figure 13:
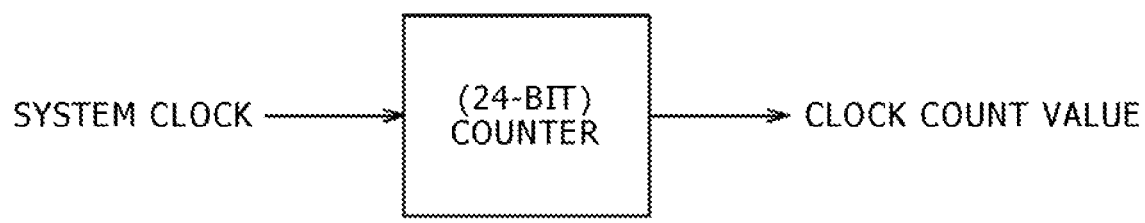
FIG. 13 is a diagram describing a first example of order information.

FIG. 13 is a diagram describing a first example of order information.

A clock count value obtained by counting a given clock, for example, can be used as order information.

Here, ISSY is defined in DVB-T2, -C2, and -S2.

One of the elements making up ISSY is input stream clock reference (ISCR) that serves as a timestamp.

ISSY is two or three bytes in size, and ISCR is one of two types, short or long.

Short ISCR is 15 bits in size, and 15-bit short ISCR makes up 2-byte (16-bit) ISSY together with 1-bit identification information for identifying ISCR as a short ISCR.

Long ISCR is 22 bits in size, and 22-bit long ISCR makes up 3-byte (24-bit) ISSY together with 2-bit identification information for identifying ISCR as a long ISCR.

ISCR is a count value obtained by counting a sampling clock, and a clock count value, information similar to such ISCR, can be used as order information.

In FIG. 13, a system clock of the transmission device 10 is counted by a counter in the transmission device 10, and a 24-bit count value, for example, obtained by counting that system clock is output.

As order information to be included in a BB header of a frame, a clock count value output from the counter when the BB frame is configured, for example, can be used.

If a clock count value is used as order information, it is possible to maintain order between BB frames (and by extension between generic packets, and further between IP packets) by using a clock count value as order information in the reception device 20. Further, it is possible to adjust (maintain) time between BB frames in the reception device 20.

It should be noted that if, for example, a 24-bit clock count value is used as described above, and if the clock counted by the counter is, for example, a 6.144 MHz clock similar to ATSC3.0 sampling clock, it is possible to count $1/(6.144 \text{ MHz}) \times 2^{24} = 2.73$ seconds by using the 24-bit clock count value.

Also, if, for example, a 16-bit clock count value is used as order information, and assuming, for example, that the clock counted by the counter is a 6.144 MHz clock as described above, it is possible to count $1/(6.144 \text{ MHz}) \times 2^{16} = 10.6$ milliseconds by using the 16-bit clock count value.

If a clock count value obtained by counting a 6.144 MHz clock is used as order information, it is preferred, in consideration of the length of the physical layer frame, that the clock count value be 24 bits (three bytes) rather than 16 bits.

<Second Example of Order Information>

Figure 14:
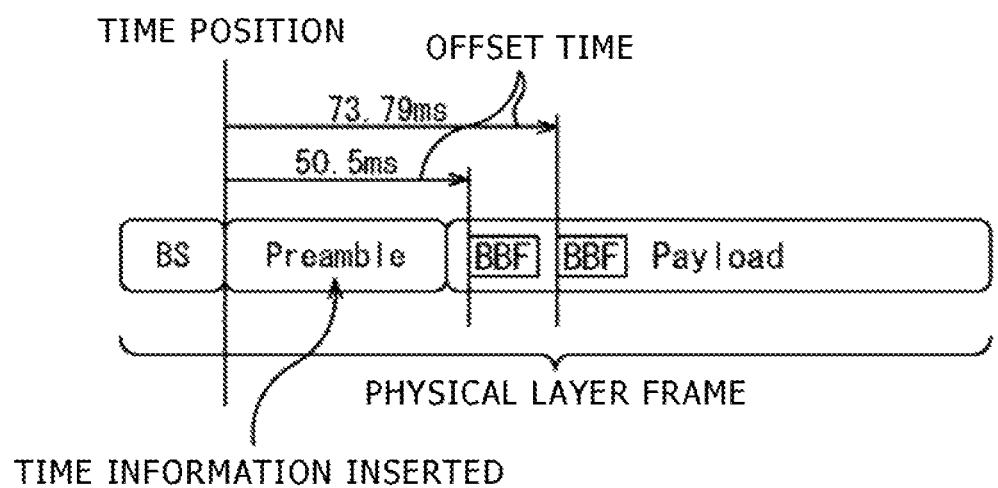
FIG. 14 is a diagram describing a second example of order information.

FIG. 14 is a diagram describing a second example of order information.

Offset time representing relative time of a BB frame position with respect to time of a given position in a stream of physical layer frames including BB frames, for example, can be used as order information.

For example, time position where time information included in the preamble of the physical layer frame represents time, i.e., for example, the starting position of the second preamble Preamble, can be used as a given position.

In this case, offset time as order information included in a BB header of a BB frame is time of the BB frame position with respect to time represented by time information included in the preamble of the physical layer frame including that BB frame.

In FIG. 14, the time position of the first BB frame (BBF) of the payload of a physical layer frame with respect to the time of the time position represented by time information included in the preamble of that physical layer frame is 50.5 milliseconds.

Also, in FIG. 14, the time position of the second BB frame (BBF) of the payload of a physical layer frame with respect to the time of the time position represented by time information included in the preamble of that physical layer frame is 73.79 milliseconds.

Assuming, here, that the unit time of the offset time as order information is, for example, 10 microseconds, it is possible to represent 0.65536 seconds (approximately 655 milliseconds)=10 µseconds×$2^{16}$ of time by using, for example, 16-bit (2-byte) offset time.

0.65536 seconds are, for example, a period of time equal to or longer than the maximum length of ATSC3.0 physical layer frame and so on. Therefore, it is possible to represent the time of each BB frame with respect to the time of the time position represented by time information included in the preamble of that physical layer frame by using 16-bit offset time as order information.

Figure 15:
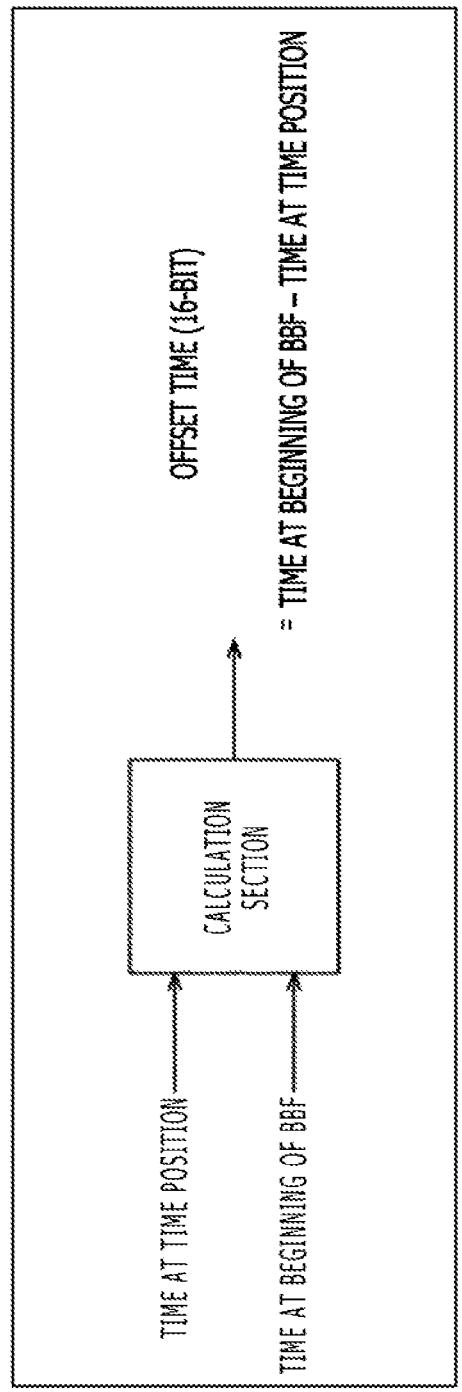
FIG. 15 is a diagram describing an example of how 16-bit offset time is generated as the second example of order information.

FIG. 15 is a diagram describing an example of how 16-bit offset time is generated as the second example of order information.

In FIG. 15, for example, a calculation section of the transmission section 10 calculates, as 16-bit offset time, the time position, i.e., the difference between the time of the starting position of the second preamble of the physical layer frame and the time of the starting position of the BB frame (BBF) included in that physical layer frame.

If offset time is used as order information, it is possible to maintain order and time between BB frames in the reception device 20 by using a clock count value as order information as when a clock count value is used.

<Third Example of Order Information>

Figure 16:
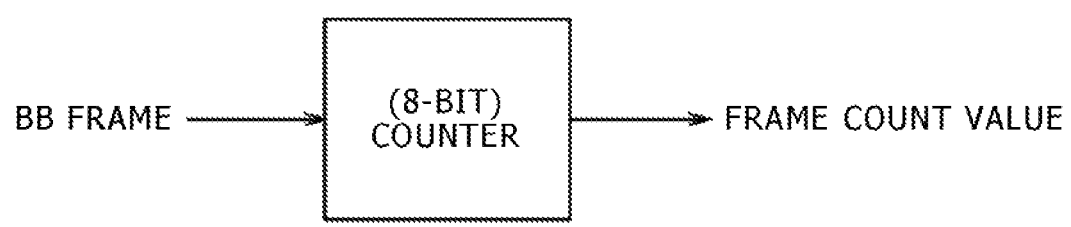
FIG. 16 is a diagram describing a third example of order information.

FIG. 16 is a diagram describing a third example of order information.

A frame count value obtained by counting a BB frame, for example, can be used as order information.

In FIG. 16, for example, a BB frame configured by the transmission device 10 is counted by a counter in the transmission device 10, and an 8-bit frame count value, for example, obtained by counting that BB frame is output.

A frame count value output from the counter, for example, when a BB frame is configured can be used as order information to be included in the BB header of that frame.

If a frame count value is used as order information, it is possible to maintain order between BB frames in the reception device 20 by using a frame count value as order information as when a clock count value or offset time is used. It should be noted, however, that if a frame count value is used as order information, it becomes difficult to maintain time between BB frames in the reception device 20.

It should be noted that if a frame count value is used as order information, it is sufficient for the frame count value to be able to count, for each physical layer frame, up to the maximum number of BB frames included in the physical layer frame in order to maintain the order of BB frames.

Therefore, eight bits (one byte), for example, can be used as a size of a frame count value.

Here, if, for example, 24 bits, 16 bits, and eight bits are used as sizes of a clock count value, offset time, and a frame count value, respectively, as in the present embodiment, the 8-bit frame count value is most advantageous in terms of low BB frame overhead.

<Configuration Example of the Transmission Device 10>

Figure 17:
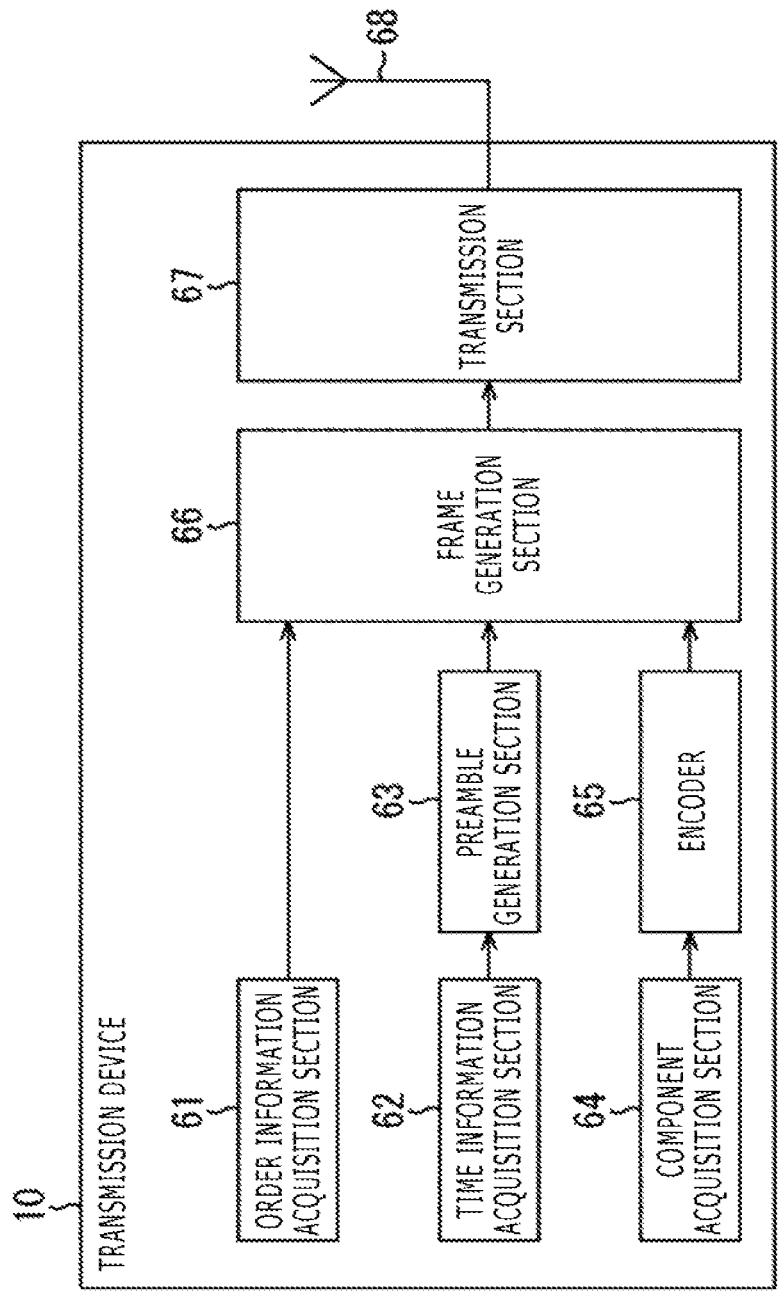
FIG. 17 is a block diagram illustrating a configuration example of a transmission device 10.

FIG. 17 is a block diagram illustrating a configuration example of the transmission device 10 shown in FIG. 1.

In FIG. 17, the transmission device 10 includes an order information acquisition section 61, a time information acquisition section 62, a preamble generation section 63, a component acquisition section 64, an encoder 65, a frame generation section 66, a transmission section 67, and an antenna 68.

The order information acquisition section 61 acquires (generates) order information and supplies the order information to the frame generation section 66.

The time information acquisition section 62 acquires time information and supplies the time information to the preamble generation section 63. The acquisition of time information is conducted as follows. That is, when packets required to configure a BB frame arrive at a scheduler that is not shown, a physical layer frame configured to include that BB frame is found from time t when the BB frame is generated by the frame generation section 66, and time T at the start of the second preamble Preamble of that physical layer frame is found. Then, the time T is supplied to the time information acquisition section 62 from the scheduler as a control signal. Time information is included in the second preamble Preamble by the preamble generation section 63 which will be described later. It should be noted that time information can be used for signal frequency network (SFN) synchronization.

The preamble generation section 63 generates preambles (first preamble BS and second preamble Preamble) with time information from the time information acquisition section 62 included, for example, in the second preamble Preamble and supplies the preambles to the frame generation section 66.

The component acquisition section 64 acquires image and sound data as components making up a service (e.g., program) and supplies the data to the encoder 65.

That is, for example, the component acquisition section 64 acquires appropriate content to suit the broadcasting time zone from a storage location of content already recorded or acquires live content from a studio or a filming location and supplies that content (its data) to the encoder 65.

The encoder 65 encodes the image and sound data supplied from the component acquisition section 64 in accordance with a given encoding scheme and supplies the data to the frame generation section 66, for example, in the form of IP packets.

The frame generation section 66 generates (configures) a physical layer frame by using, as appropriate, order information from the order information acquisition section 61, preambles from the preamble generation section 63, and IP packets from the encoder 65 and supplies the physical layer frame to the transmission section 67.

That is, the frame generation section 66 configures generic packets in which IP packets from the encoder 65 are placed. Further, the frame generation section 66 places the generic packets in the payload of a BB frame and configures the BB frame that includes order information from the order information acquisition section 61 in the BB header.

Also, the frame generation section 66 configures an FEC frame from the BB frame, subjects the BB frame to required processes, and places the FEC frame in the payload of a physical layer frame.

Then, the frame generation section 66 configures the physical layer frame by adding the preambles from the preamble generation section 63 to the payload of the physical layer frame and supplies the physical layer frame to the transmission section 67.

The transmission section 67 performs digital modulation, upconversion, and other processes on the physical layer frame from the frame generation section 66 and sends the frame as a digital broadcasting signal via the antenna 68.

It should be noted that, in the transmission device 10 shown in FIG. 17, all functional blocks need not be placed in a single device and that at least some of the functional blocks may be configured as a device physically independent from other functional blocks.

<Transmission Process>

Figure 18:
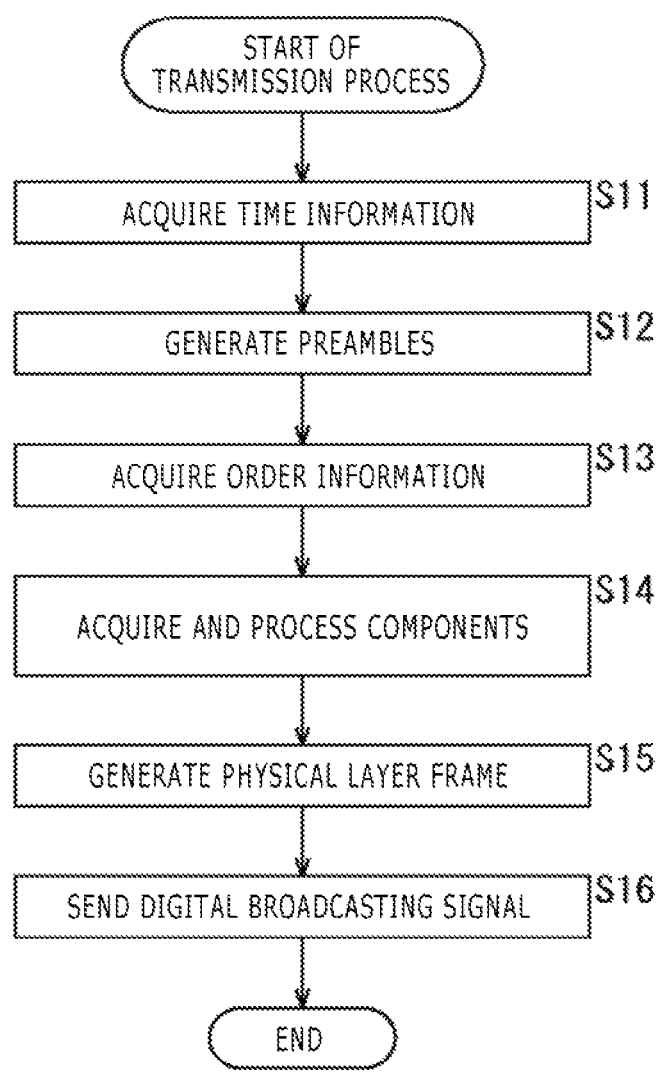
FIG. 18 is a flowchart describing an example of a transmission process handled by the transmission device 10.

FIG. 18 is a flowchart describing an example of a transmission process handled by the transmission device 10 shown in FIG. 17.

In step S11, the time information acquisition section 62 acquires time information and supplies the time information to the preamble generation section 63, after which the process proceeds to step S12.

In step S12, the preamble generation section 63 generates preambles of the physical layer frame with time information from the time information acquisition section 62 included in the second preamble Preamble and supplies the preambles to the frame generation section 66, after which the process proceeds to step S13.

In step S13, the order information acquisition section 61 acquires order information and supplies the order information to the frame generation section 66, after which the process proceeds to step S14.

In step S14, the component acquisition section 64 acquires image and sound data as components making up a service and supplies the data to the encoder 65.

The encoder 65 performs encoding and other processes on the image and sound data supplied from the component acquisition section 64 and supplies the data to the frame generation section 66 in the form of IP packets, after which the process proceeds from step S14 to step S15.

In step S15, the frame generation section 66 generates a physical layer frame by using, as appropriate, order information from the order information acquisition section 61, preambles from the preamble generation section 63, and IP packets from the encoder 65 and supplies the physical layer frame to the transmission section 67, after which the process proceeds to step S16.

In step S16, the transmission section 67 sends the physical layer frame from the frame generation section 66 as a digital broadcasting signal via the antenna 68.

<Configuration Example of the Reception Device 20>

Figure 19:
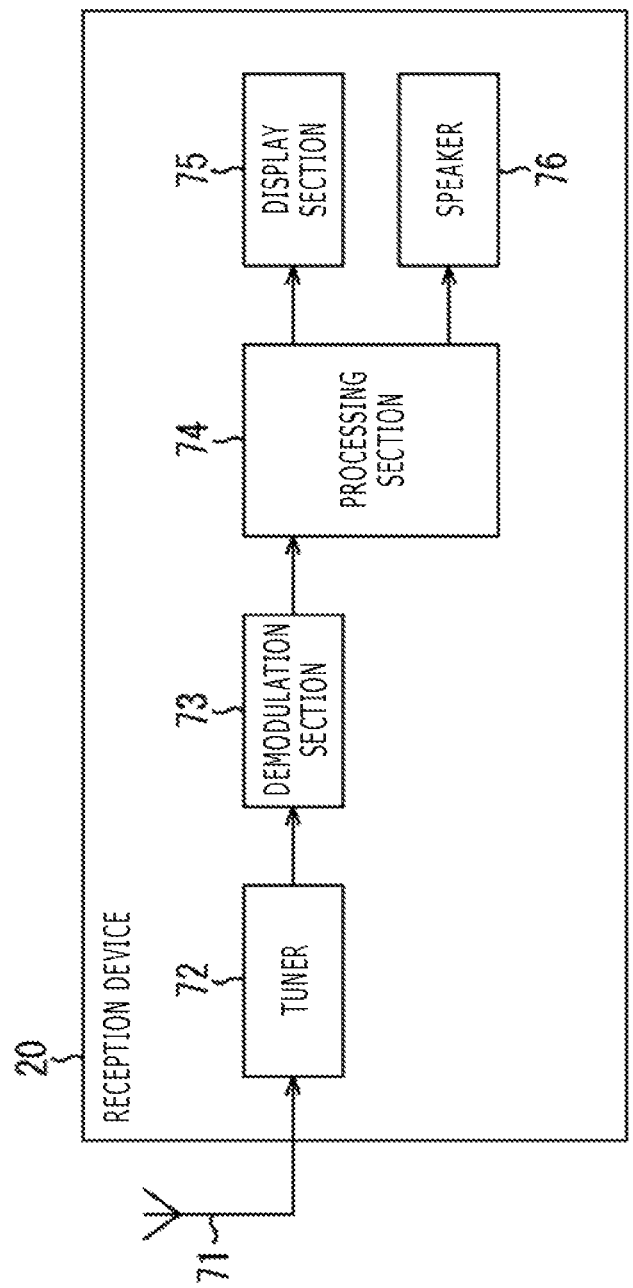
FIG. 19 is a block diagram illustrating a configuration example of a reception device 20.

FIG. 19 is a block diagram illustrating a configuration example of the reception device 20 shown in FIG. 1.

In FIG. 19, the reception device 20 includes an antenna 71, a tuner 72, a demodulation section 73, a processing section 74, a display section 75, and a speaker 76.

The antenna 71 receives a digital broadcasting signal from the transmission device 10 and supplies the signal to the tuner 72.

The tuner 72 selects a given frequency channel component from the digital broadcasting signal from the antenna 71, receives the physical layer frame sent over that frequency channel, and supplies the physical layer frame to the demodulation section 73.

The demodulation section 73 performs a demodulation process of the physical layer frame supplied from the tuner 72.

That is, the demodulation section 73 demodulates the preambles (first preamble BS and second preamble Preamble) of the physical layer frame and further demodulates the payload of the physical layer frame by using, as necessary, the demodulation result of the preambles.

Also, the demodulation section 73 demodulates (decodes) the FEC frame acquired by demodulation of the payload of the physical layer frame.

Then, the demodulation section 73 demodulates generic packets from the BB frame acquired as a result of demodulation of the FEC frame, demodulates IP packets from the generic packets, and supplies the IP packets to the processing section 74.

Also, the demodulation section 73 acquires time information included in the preamble of the physical layer frame and order information included in the BB header of the BB frame during the demodulation process and supplies the information to the processing section 74.

The processing section 74 decodes images and sounds of the program from the IP packets from the demodulation section 73 and supplies the images to the display section 75 and the sounds to the speaker 76.

Also, the processing section 74 (or the demodulation section 73) performs necessary processes using the time information and order information from the demodulation section 73.

That is, the processing section 74 (or the demodulation section 73) performs, for example, a process of establishing synchronization with the transmission device 10 using time information. Also, the processing section 74 performs, for example, a process of maintaining order of the BB frame (order of the IP packets included in the payloads of the generic packets placed in the BB frame) and time thereof using order information. It should be noted that time information can be used, for example, to establish synchronization such as SFN synchronization for DVB-T.2 and for other purposes.

The display section 75 displays images from the processing section 74. The speaker 76 outputs sounds from the processing section 74.

It should be noted that although, in the reception device 20 shown in FIG. 19, a configuration in which the display section 75 and the speaker 76 are built into the reception device 20 is described, the display section 75 and the speaker 76 may be provided externally.

<Reception Process>

Figure 20:
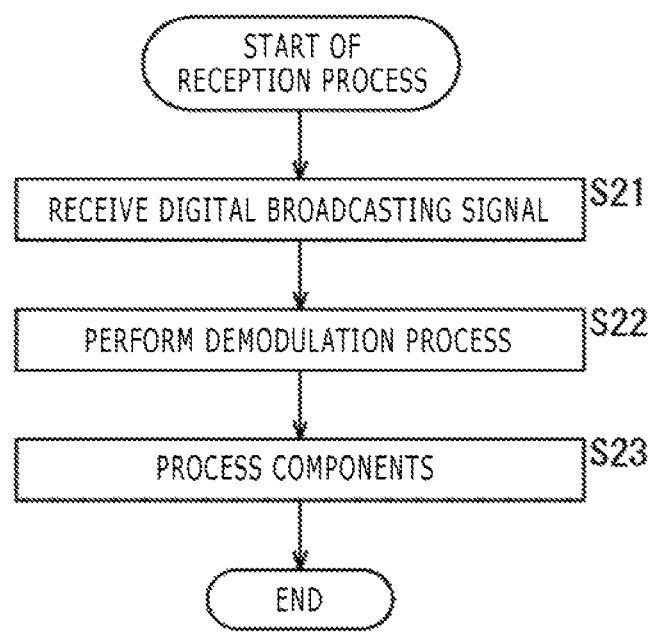
FIG. 20 is a flowchart describing an example of a reception process handled by the reception device 20.

FIG. 20 is a flowchart describing an example of a reception process handled by the reception device 20 shown in FIG. 19.

In step S21, the tuner 72 receives a physical layer frame from a digital broadcasting signal from the antenna 71 and supplies the physical layer frame to the demodulation section 73, after which the process proceeds to step S22.

In step S22, the demodulation section 73 performs a demodulation process on the physical layer frame supplied from the tuner 72 and supplies IP packets, time information, and order information obtained as a result thereof to the processing section 74, after which the process proceeds to step S23.

In step S23, the processing section 74 performs a process of establishing synchronization with the transmission device 10 using time information and further performs a process of maintaining order of the BB frame (order of the IP packets included in the payloads of the generic packets placed in the BB frame) using order information.

Then, with synchronization established with the transmission device 10 and order of the BB frame maintained, the processing section 74 decodes images and sounds of the program from the IP packets from the demodulation section 73, supplies the images to the display section 75 so that the images are displayed, and supplies the sounds to the speaker 76 so that the sounds are output.

As described above, in the transmission system shown in FIG. 1, the transmission device 10 includes time information in the preamble of the physical layer frame and order information in the BB header of the BB frame for transmission, ensuring efficient transmission of time information and order information.

Further, in the transmission system shown in FIG. 1, the reception device 20 performs processes using time information included in the preamble of the physical layer frame and order information included in the BB header of the BB frame, allowing for speedy processing.

It should be noted that although, in the description given above, IP packets are transmitted in the transmission system shown in FIG. 1, data other than IP packets may be transmitted. That is, TS packets can be transmitted, for example, if a clock count value or offset time that allows time adjustment between BB frames is used as order information.

Also, the transmission system shown in FIG. 1 is applicable for ATSC3.0, DVB, ISDB, and other arbitrary data transmission.

<DVB-T.2 Physical Layer Frame>

Figure 21:
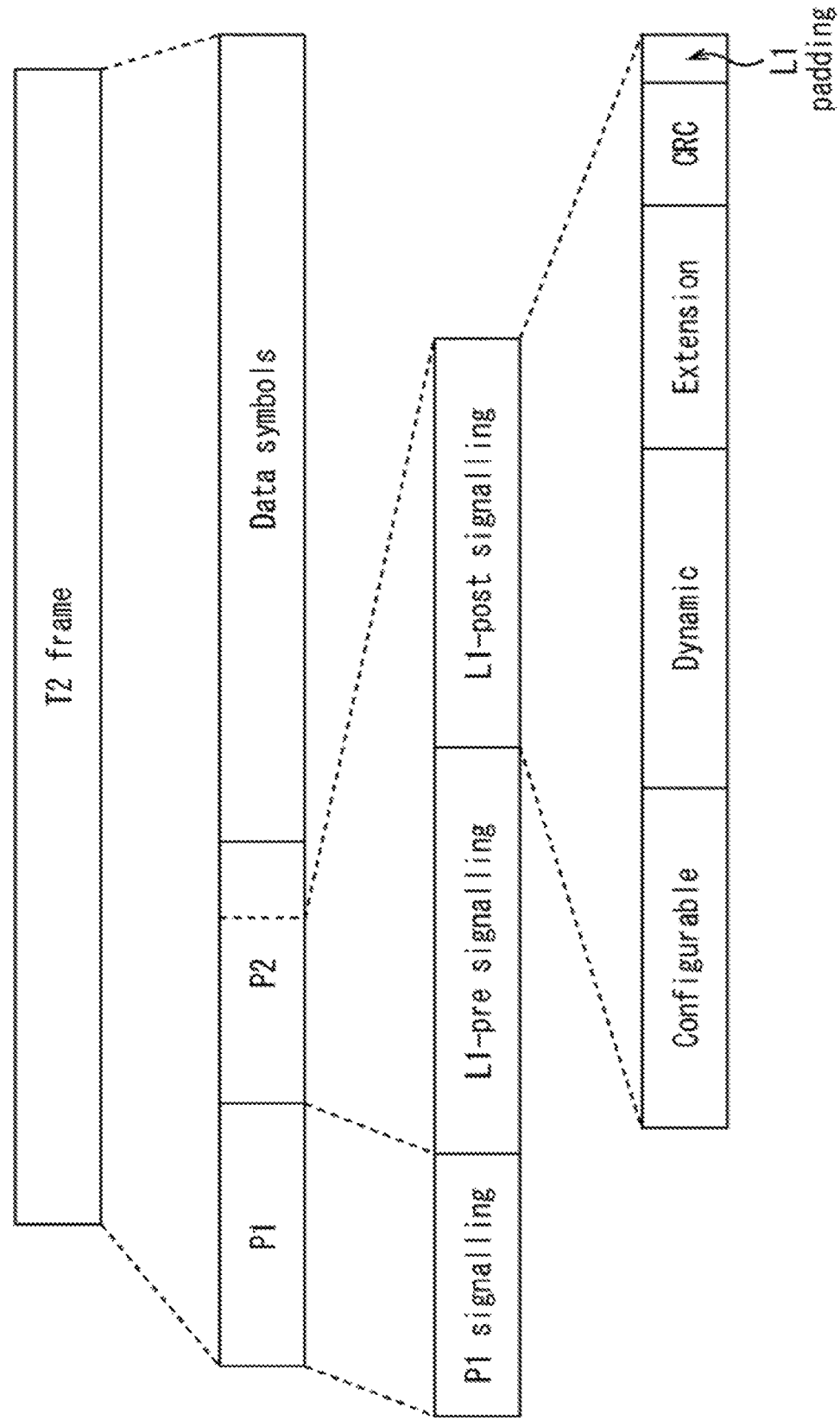
FIG. 21 is a diagram illustrating a configuration of a T2 frame (T2frame), a physical layer frame of digital video broadcasting (DVB)-T.2.

FIG. 21 is a diagram illustrating a configuration of a T2 frame (T2frame), a physical layer frame of DVB-T.2.

A T2 frame has P1 and P2 as preambles and a data symbol (Data Symbol) as a payload.

The P1 has P1 signaling, and the P2 has L1-pre signaling and L1-post signaling.

The L1-post signaling has Configurable, Dynamic, Extension, CRC, and L1 padding.

Time information can be included in the T2 frame preambles described above (e.g., P2 of the preambles).

Also, order information can be included in a BB header of a BB frame placed as a data symbol of a T2 frame described above.

<Description of the Computer to which the Present Technology is Applied>

Next, a series of processes handled by the transmission device 10 and the reception device 20 can be handled by both hardware and software. If the series of processes are handled by software, the program making up the software is installed to a computer.

Figure 22:
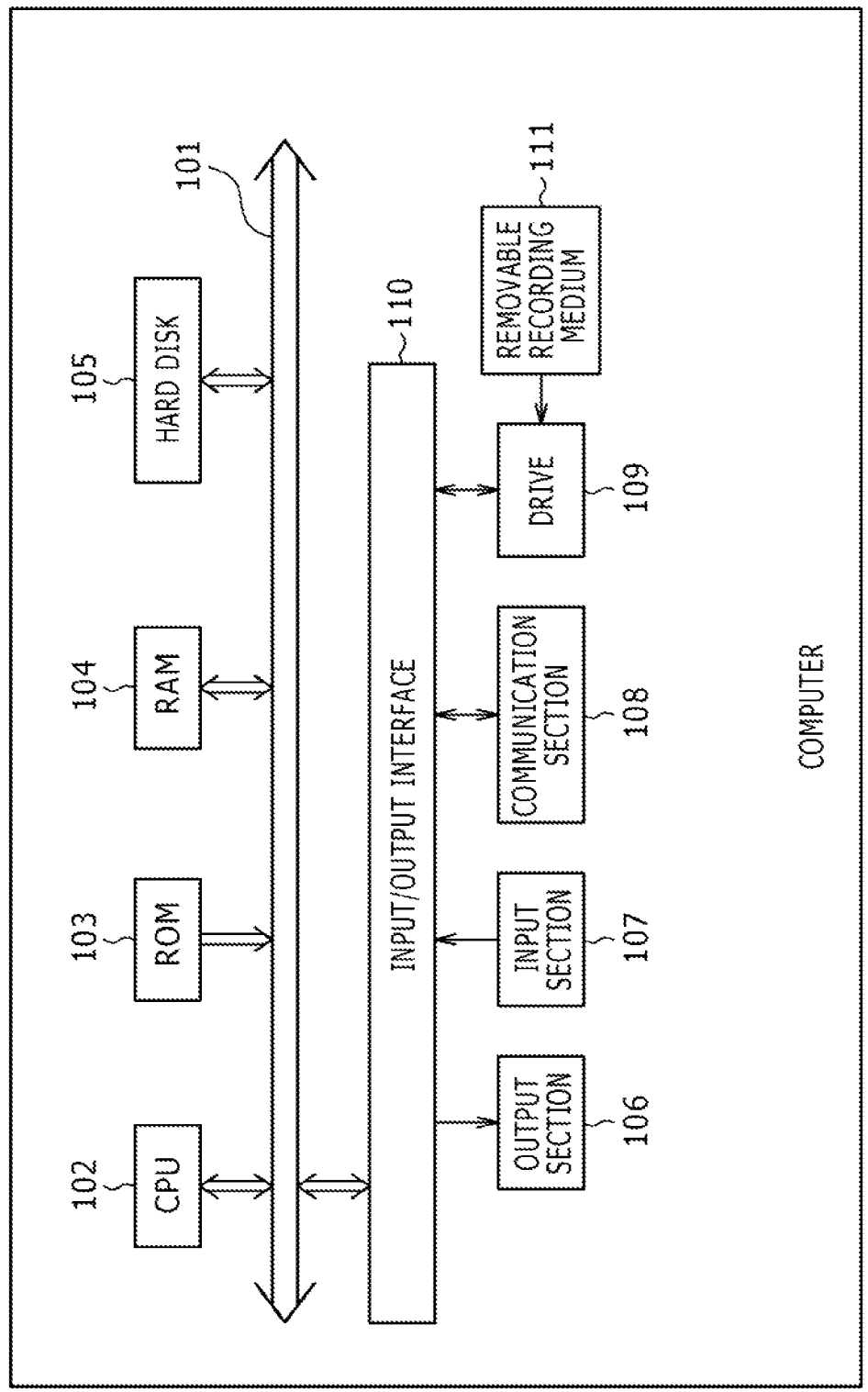
FIG. 22 is a block diagram illustrating a configuration example of an embodiment of a computer to which the present technology is applied.

FIG. 22 is a block diagram illustrating a configuration example of an embodiment of a computer to which the program handling the above series of processes is installed.

The program can be recorded, in advance, to a hard disk 105 as a built-in recording medium of the computer or to a read only memory (ROM) 103.

Alternatively, the program can be stored (recorded) in a removable recording medium 111. The removable recording medium 111 of this kind can be provided as so-called packaged software. Here, among examples of the removable recording medium 111 are flexible disk, compact disc read only memory (CD-ROM), magneto optical (MO) disk, digital versatile disc (DVD), magnetic disk, and semiconductor memory.

It should be noted that the program can be downloaded to the computer via a communication network or broadcasting network and installed to the hard disk 105 in addition to being installed to the computer from the above removable recording medium 111. That is, the program can be, for example, transferred from a download site to the computer in a wireless manner via an artificial satellite for digital satellite broadcasting or to the computer in a wired manner via a network such as local area network (LAN) or the Internet.

The computer incorporates a central processing unit (CPU) 102, and an input/output (I/O) interface 110 is connected to the CPU 102 via a bus 101.

When an instruction is input by a user via the I/O interface 110 by operating an input section 107, the CPU 102 executes the program, stored in the ROM 103, in accordance with the instruction. Alternatively, the CPU 102 loads the program stored in the hard disk 105 into a random access memory (RAM) 104 and executes the program.

As a result, the CPU 102 performs the processes in accordance with the flowchart described above or the processes handled by the configuration in the block diagram described above. Then, the CPU 102 causes the processing result to be output from the output section 106 or sent from a communication section 108 via the I/O interface 110 and further records the processing result to the hard disk 105 as necessary.

It should be noted that the input section 107 includes a keyboard, a mouse, a microphone, and so on. Also, the output section 106 includes a liquid crystal display (LCD), a speaker, and so on.

Here, in the present specification, the processes handled by the computer in accordance with the program need not necessarily be performed chronologically according to the sequence given in the flowchart. That is, the processes handled by the computer in accordance with the program include those performed in parallel or individually (e.g., parallel processes or object-based processes).

Also, the program may be processed by a single computer (processor) or by a plurality of computers in a distributed manner. Further, the program may be transferred to a remote computer and executed.

Further, in the present specification, the system refers to a set of a plurality of components (e.g., devices, modules (parts) or the like), and whether or not all the components are contained in the same housing does not matter. Therefore, a plurality of devices accommodated in separate housings and connected via a network and a single device having a plurality of modules accommodated in a single housing are both systems.

It should be noted that embodiments of the present technology are not limited to that described above and can be modified in various ways without departing from the gist of the present technology.

For example, the present technology can have a cloud computing configuration in which one function is processed by a plurality of devices via a network in a shared and cooperative manner.

Also, each of the steps described in the above flowchart can be performed not only by a single device but also by a plurality of devices in a shared manner.

Further, if a plurality of processes are included in one step, the processes included in the one step can be performed not only by a single device but also by a plurality devices in a shared manner.

Also, the effect described in the present specification is merely illustrative and not restrictive, and other effects are allowed.

It should be noted that the present technology can also have the following configurations.

<1>

A transmission device includes a generation section adapted to generate a physical layer frame having preambles and a payload that includes, in the preamble, time information representing time of a given position in a stream of physical layer frames, and a transmission section adapted to send the physical layer frame.

<2>

The transmission device of feature <1>, in which the preambles have a first preamble and a second preamble that follows the first preamble, and the time information is included in the second preamble and represents time of a starting position of the second preamble.

<3>

The transmission device of feature <1> or <2>, in which the time information is time information defined by NTP, time information defined by 3GPP, or time information defined by PTP.

<4>

A transmission method includes generating a physical layer frame having preambles and a payload and includes, in the preamble, time information representing time of a given position in a stream of physical layer frames, and transmitting the physical layer frame.

<5>

A reception device includes a reception section adapted to receive a physical layer frame having preambles and a payload that includes, in the preamble, time information representing time of a given position in a stream of physical layer frames, and a processing section adapted to perform processes using the time information included in the preamble of the physical layer frame.

<6>

The reception device of feature <5>, in which the preambles have a first preamble and a second preamble that follows the first preamble, and the time information is included in the second preamble and represents time of a starting position of the second preamble.

<7>

The reception device of feature <5> or <6>, in which the time information is time information defined by NTP, time information defined by 3GPP, or time information defined by PTP.

<8>

A reception method includes receiving a physical layer frame having preambles and a payload that includes, in the preamble, time information representing time of a given position in a stream of physical layer frames, and performing processes using the time information included in the preamble of the physical layer frame.

<9>

A transmission device includes a generation section adapted to generate a BB (BaseBand) frame that includes, in a BB header, order information on BB frame order, and a transmission section adapted to send the BB frame.

<10>

The transmission device of feature <9>, in which the order information is a frame count value obtained by counting the BB frame.

<11>

The transmission device of feature <9>, in which the order information is offset time representing relative time of a BB frame position with respect to time of a given position in a stream of physical layer frames including the BB frames.

<12>

The transmission device of feature <9>, in which the order information is a clock count value obtained by counting a given clock.

<13>

A transmission method includes generating a BB (BaseBand) frame that includes, in a BB header, order information on BB frame order, and transmitting the BB frame.

<14>

A reception device includes a reception section adapted to receive a BB (BaseBand) frame that includes, in a BB header, order information on BB frame order, and a processing section adapted to perform processes using the order information included in the BB header of the BB frame.

<15>

The reception device of feature <14>, in which the order information is a frame count value obtained by counting the BB frame.

<16>

The reception device of feature <14>, in which the order information is offset time representing relative time of a BB frame position with respect to time of a given position in a stream of physical layer frames including the BB frames.

<17>

The reception device of feature <14>, in which the order information is a clock count value obtained by counting a given clock.

<18>

A reception method includes receiving a BB (BaseBand) frame that includes, in a BB header, order information on BB frame order, and performing processes using the order information included in the BB header of the BB frame.

REFERENCE SIGNS LIST

10 Transmission device, 20 Reception device, 30 Transmission channel, 61 Order information acquisition section, 62 Time information acquisition section, 63 Preamble generation section, 64 Component acquisition section, 65 Encoder, 66 Frame generation section, 67 Transmission section, 68, 71 Antenna, 72 Tuner, 73 Demodulation section, 74 Processing section, 75 Display section, 76 Speaker, 101 Bus, 102 CPU, 103 ROM, 104 RAM, 105 Hard disk, 106 Output section, 107 Input section, 108 Communication section, 109 Drive, 110 I/O interface, 111 Removable recording medium

The invention claimed is:

1. A transmission device comprising:
circuitry configured to:
generate a BaseBand packet that includes a BaseBand header and a payload, wherein:
 the BaseBand header contains a first field, the first field including 1-bit mode information indicating whether the BaseBand header includes one byte or two bytes,
 in a case where the BaseBand header includes two bytes, the BaseBand header includes flag information indicating whether the BaseBand header is extended with an optional field and whether the BaseBand header is extended with an extension field, and
 in a case where the BaseBand header is extended, the optional field includes extension type information indicating that the extension field includes a counter of BaseBand packets; and
transmit the BaseBand packet.

2. A transmission method comprising:
generating a BaseBand packet that includes a BaseBand header and a payload, wherein:
 the BaseBand header contains a first field, the first field including 1-bit mode information indicating whether the BaseBand header includes one byte or two bytes,
 in a case where the BaseBand header includes two bytes, the BaseBand header includes flag information indicating whether the BaseBand header is extended with an optional field and whether the BaseBand header is extended with an extension field, and
 in a case where the BaseBand header is extended, the optional field includes extension type information indicating that the extension field includes a counter of BaseBand packets; and
 transmitting the BaseBand packet.

3. The transmission method as claimed in claim 2, wherein, if the flag information is set to "00," the BaseBand header is not extended.

4. The transmission method as claimed in claim 2, wherein, if the flag information is set to "01," the BaseBand header includes one byte in the optional field.

5. The transmission method as claimed in claim 2, wherein, if the flag information is set to "10," the BaseBand header includes two bytes in the optional field.

6. The transmission method as claimed in claim 2, wherein the flag information is represented by two bits.

7. A reception device comprising:
circuitry configured to:
receive a BaseBand packet that includes a BaseBand header and a payload, the BaseBand header containing a first field, the first field including 1-bit mode information indicating whether the BaseBand header includes one byte or two bytes; and
perform processes using the 1-bit mode information, wherein:
 in a case where the BaseBand header includes two bytes, the BaseBand header includes flag information indicating whether the BaseBand header is extended with an optional field and whether the BaseBand header is extended with an extension field, and
 in a case where the BaseBand header is extended, the optional field includes extension type information indicating that the extension field includes a counter of BaseBand packets.

8. The reception device as claimed in claim 7, wherein, if the flag information is set to "00," the BaseBand header is not extended.

9. The reception device as claimed in claim 7, wherein, if the flag information is set to "01," the BaseBand header includes one byte in in the optional field.

10. The reception device as claimed in claim 7, wherein, if the flag information is set to "10," the BaseBand header includes two bytes in the optional field.

11. The reception device as claimed in claim 7, wherein the flag information is represented by two bits.

12. The reception device as claimed in claim 7, wherein, in the case where the BaseBand header is extended, the optional field includes an extension length.

13. The reception device as claimed in claim 7, further comprising:
a tuner;
a display; and
a speaker, wherein
 the tuner is configured to receive a physical layer frame including the BaseBand packet, the physical layer frame including image data and sound data, and
 the reception device is configured to decode the image data into images and sound data into sounds and to supply the images to the display and the sounds to the speaker.

14. A reception method comprising:
receiving a BaseBand packet that includes a BaseBand header and a payload, the BaseBand header containing a first field, the first field including 1-bit mode information indicating whether the BaseBand header includes one byte or two bytes; and
performing processes using the 1-bit mode information, wherein:
 in a case where the BaseBand header includes two bytes, the BaseBand header includes flag information indicating whether the BaseBand header is extended with an optional field and whether the BaseBand header is extended with an extension field, and
 in a case where the BaseBand header is extended, the optional field includes extension type information indicating that the extension field includes a counter of BaseBand packets.

15. The reception method as claimed in claim 14, wherein, if the flag information is set to "00," the BaseBand header is not extended.

16. The reception method as claimed in claim 14, wherein, if the flag information is set to "01," the BaseBand header includes one byte in the optional field.

17. The reception method as claimed in claim 14, wherein, if the flag information is set to "10," the BaseBand header includes two bytes in the optional field.

18. The reception method as claimed in claim 14, wherein the flag information is represented by two bits.

19. The reception method as claimed in claim 14, wherein, in the case where the BaseBand header is extended, the optional field includes an extension length.

20. The reception method as claimed in claim 14, further comprising:
   receiving a physical layer frame including the BaseBand packet, the physical layer frame including image data and sound data;
   decoding the image data into images and sound data into sounds; and
   supplying the images to the display and the sounds to the speaker.

\* \* \* \* \*